United States Patent

Ijichi

(10) Patent No.: US 8,463,842 B2
(45) Date of Patent: *Jun. 11, 2013

(54) CONTENT ACQUISITION APPARATUS, CONTENT ACQUISITION METHOD AND CONTENT ACQUISITION PROGRAM

(75) Inventor: Susumu Ijichi, Kanagawa (JP)

(73) Assignee: Sony Corporation, Tokyo (JP)

( * ) Notice: Subject to any disclaimer, the term of this patent is extended or adjusted under 35 U.S.C. 154(b) by 34 days.

This patent is subject to a terminal disclaimer.

(21) Appl. No.: 12/698,909

(22) Filed: Feb. 2, 2010

(65) Prior Publication Data

US 2010/0174777 A1    Jul. 8, 2010

Related U.S. Application Data

(63) Continuation of application No. 11/474,940, filed on Jun. 27, 2006, now Pat. No. 7,685,225.

(30) Foreign Application Priority Data

Jun. 29, 2005  (JP) ............................ P2005-190489
Sep. 15, 2005  (JP) ............................ P2005-268619

(51) Int. Cl.
*G06F 15/16*   (2006.01)
*G06F 17/00*   (2006.01)

(52) U.S. Cl.
USPC ............................................ 709/201; 700/94

(58) Field of Classification Search
USPC ................................................. 709/201–203
See application file for complete search history.

(56) References Cited

U.S. PATENT DOCUMENTS

| 5,506,370 | A |  | 4/1996 | Nakai et al. |
| 5,561,849 | A |  | 10/1996 | Mankovitz |
| 5,808,223 | A |  | 9/1998 | Kurakake et al. |
| 6,538,188 | B2 |  | 3/2003 | Kondo |
| 7,206,748 | B1 | * | 4/2007 | Gruse et al. ..................... 705/51 |
| 7,284,036 | B2 | * | 10/2007 | Ramaswamy ................ 709/217 |
| 7,346,320 | B2 |  | 3/2008 | Chumbley et al. |
| 7,373,318 | B2 |  | 5/2008 | Hiratsuka et al. |

(Continued)

FOREIGN PATENT DOCUMENTS

| CN | 1237765 A | 12/1999 |
| CN | 1459057 A | 11/2003 |

(Continued)

OTHER PUBLICATIONS

European Search Report dated Apr. 29, 2010, issued in Counterpart Application No. 06253369.0-2225 (7 pages).

*Primary Examiner* — Krisna Lim
(74) *Attorney, Agent, or Firm* — Finnegan, Henderson, Farabow, Garrett & Dunner, LLP

(57) ABSTRACT

The present invention provides a music purchasing/transfer system allowing contents to be acquired in a remarkably efficient manner. In the system, a content acquisition apparatus, and method and program thereof are provided. The apparatus includes a content storage section used for storing contents; an output section for outputting the identification of every content that can be presented by a Content providing apparatus for presenting contents; and a content acquisition section for acquiring a content, which is identified by a content identification selected by carrying out an operation to select one of identifications output by the output section, from the content providing apparatus, wherein the output section outputs identifications of contents not stored yet in the content storage section as identifications different from other identifications output as identifications of other contents already stored in the content storage section.

17 Claims, 20 Drawing Sheets

U.S. PATENT DOCUMENTS

| | | |
|---|---|---|
| 7,579,543 B2 | 8/2009 | Haruyama et al. |
| 7,672,873 B2 * | 3/2010 | Kindig et al. ............... 705/26.1 |
| 7,693,992 B2 * | 4/2010 | Watson ......................... 709/226 |
| 2002/0069127 A1 | 6/2002 | Enari |
| 2003/0014268 A1 | 1/2003 | Tobin et al. |
| 2003/0018491 A1 | 1/2003 | Nakahara et al. |
| 2003/0051595 A1 | 3/2003 | Hasegawa |
| 2003/0052913 A1 * | 3/2003 | Barile ........................... 345/745 |
| 2003/0158947 A1 * | 8/2003 | Bloch et al. .................. 709/227 |
| 2003/0163399 A1 * | 8/2003 | Harper et al. ................... 705/35 |
| 2004/0019396 A1 | 1/2004 | McMahon et al. |
| 2004/0024688 A1 | 2/2004 | Bi et al. |
| 2004/0117276 A1 * | 6/2004 | Kettler, III ...................... 705/29 |
| 2004/0236956 A1 | 11/2004 | Shen et al. |
| 2005/0195695 A1 * | 9/2005 | Yanase et al. ............. 369/30.06 |
| 2005/0197906 A1 * | 9/2005 | Kindig et al. .................. 705/15 |
| 2006/0095339 A1 * | 5/2006 | Hayashi et al. ................ 705/26 |
| 2006/0095848 A1 * | 5/2006 | Naik ............................. 715/716 |
| 2006/0149398 A1 * | 7/2006 | Sato et al. ....................... 700/94 |
| 2006/0167574 A1 | 7/2006 | Kawakami |
| 2006/0200413 A1 * | 9/2006 | Kessel et al. .................... 705/50 |
| 2006/0201310 A1 | 9/2006 | Takashima et al. |
| 2007/0011229 A1 | 1/2007 | Ijichi |
| 2007/0025197 A1 | 2/2007 | Kinouchi et al. |
| 2008/0109528 A1 | 5/2008 | Knight et al. |
| 2008/0147557 A1 | 6/2008 | Sheehy |
| 2008/0229910 A1 | 9/2008 | Koboyashi et al. |
| 2009/0055462 A1 | 2/2009 | Mori et al. |

FOREIGN PATENT DOCUMENTS

| | | |
|---|---|---|
| EP | 1 209 581 A2 | 5/2002 |
| JP | 2001-93226 | 4/2001 |
| JP | 2003-178533 | 6/2003 |
| JP | 2005-216391 | 8/2005 |
| WO | WO 2004/097635 A2 | 11/2004 |

* cited by examiner

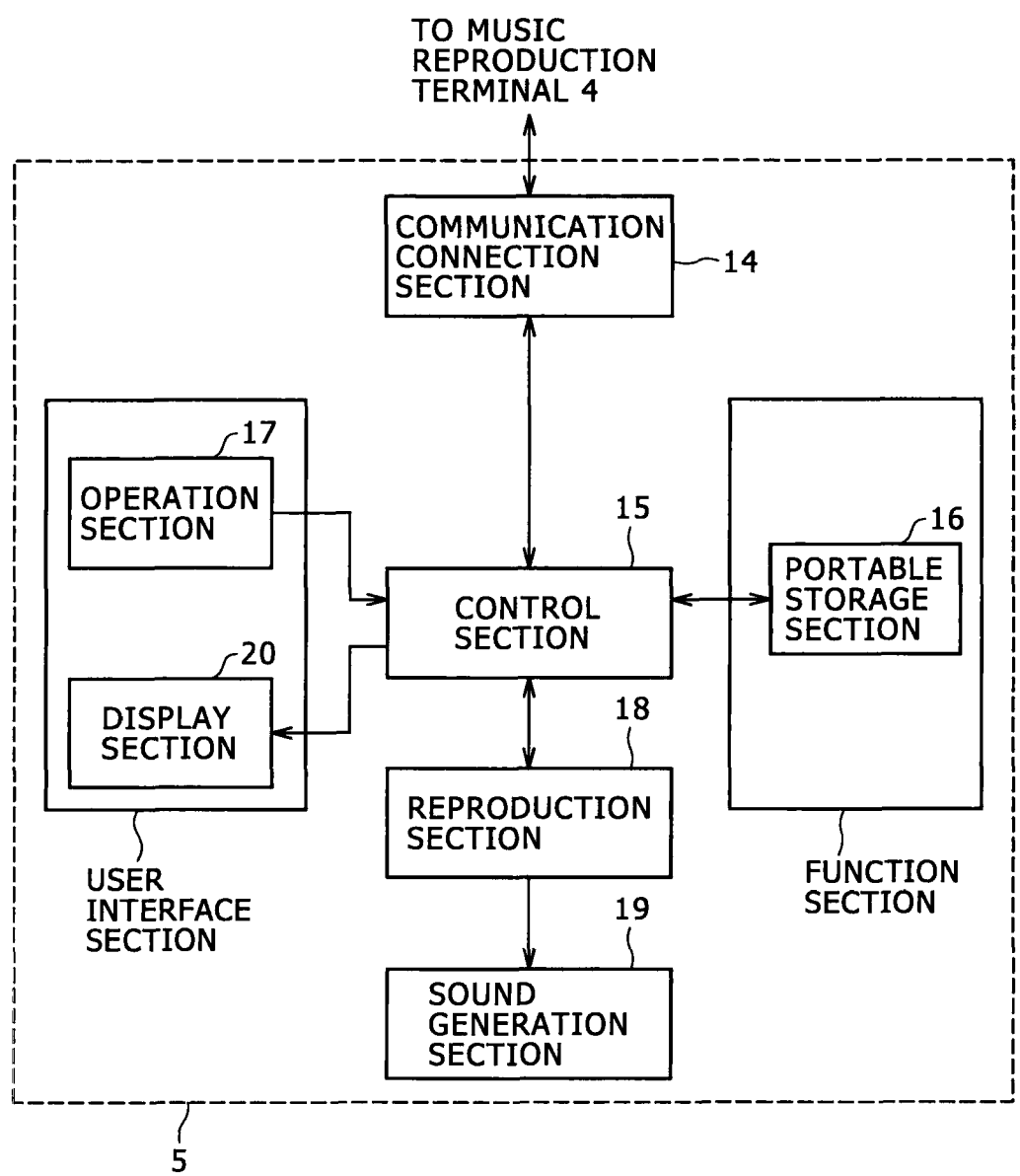

FIG. 5

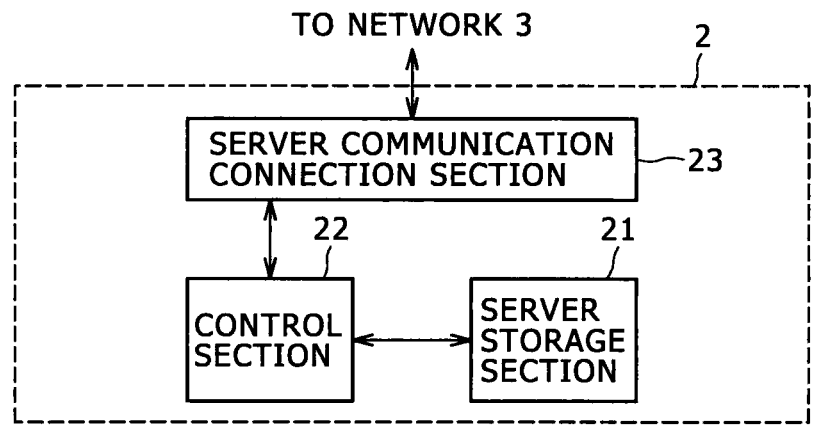

FIG. 6A

| LIST INFORMATION | | MUSIC MANAGEMENT LIST IDENTIFICATION |
|---|---|---|
| ID | MUSICAL-DATA RELATED INFORMATION | MUSICAL-DATA STATUS |
| ID | MUSICAL-DATA RELATED INFORMATION | MUSICAL-DATA STATUS |
| ID | MUSICAL-DATA RELATED INFORMATION | MUSICAL-DATA STATUS |
| ID | MUSICAL-DATA RELATED INFORMATION | MUSICAL-DATA STATUS |
| ID | MUSICAL-DATA RELATED INFORMATION | MUSICAL-DATA STATUS |

FIG. 6B

| MUSICAL-DATA EXISTENCE/NON-EXISTENCE | ACQUISITION REQUEST EXISTENCE/NON-EXISTENCE |
|---|---|

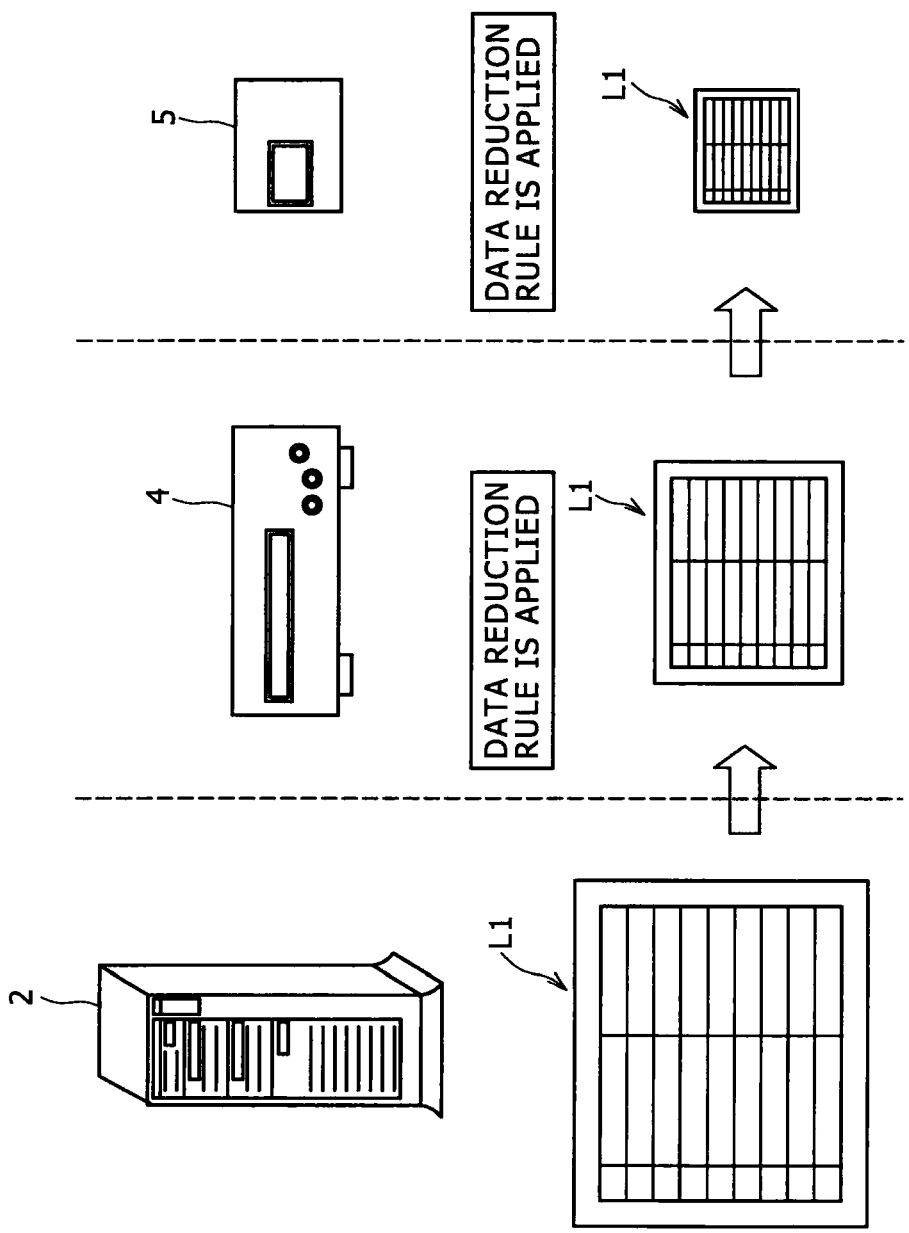

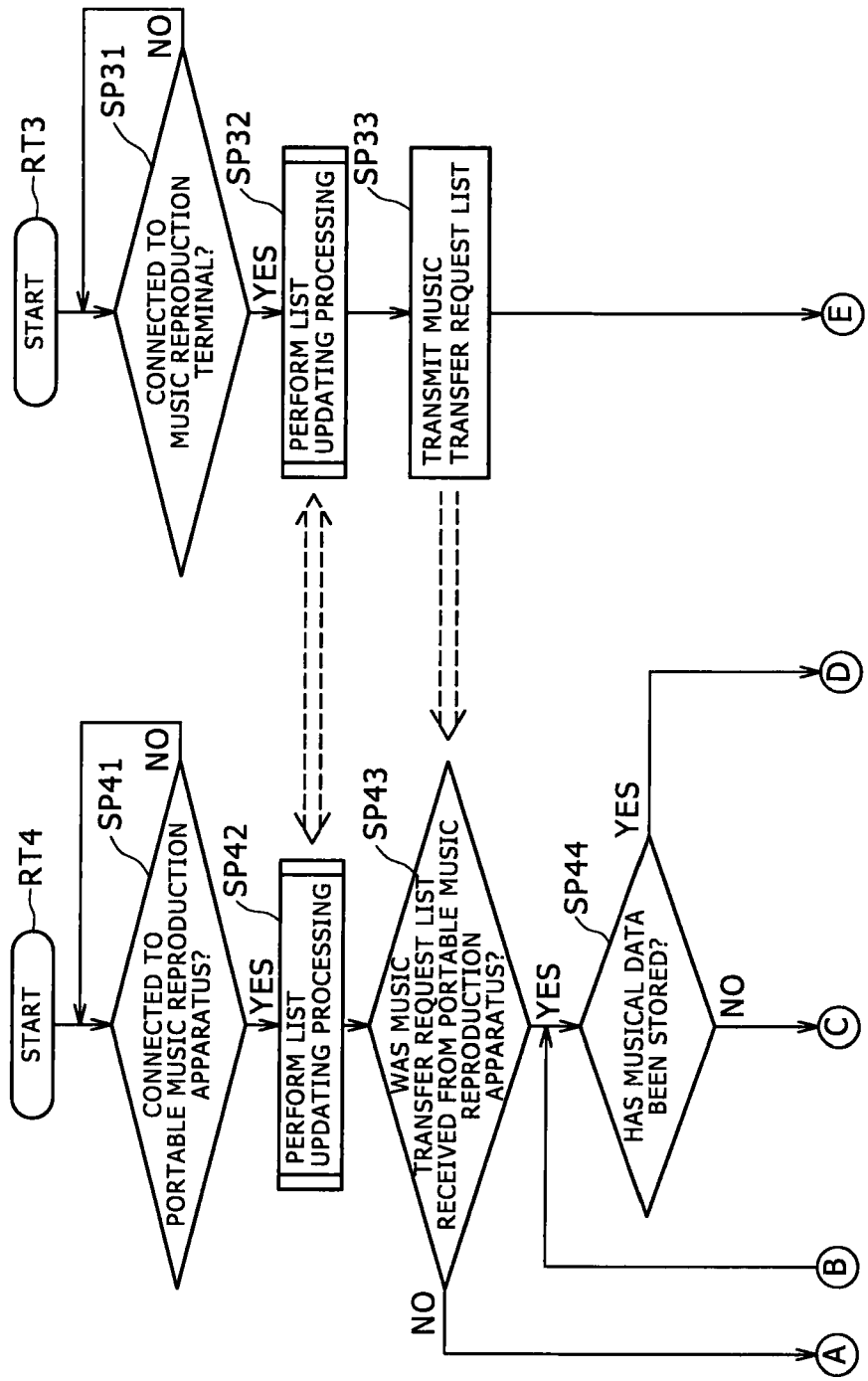

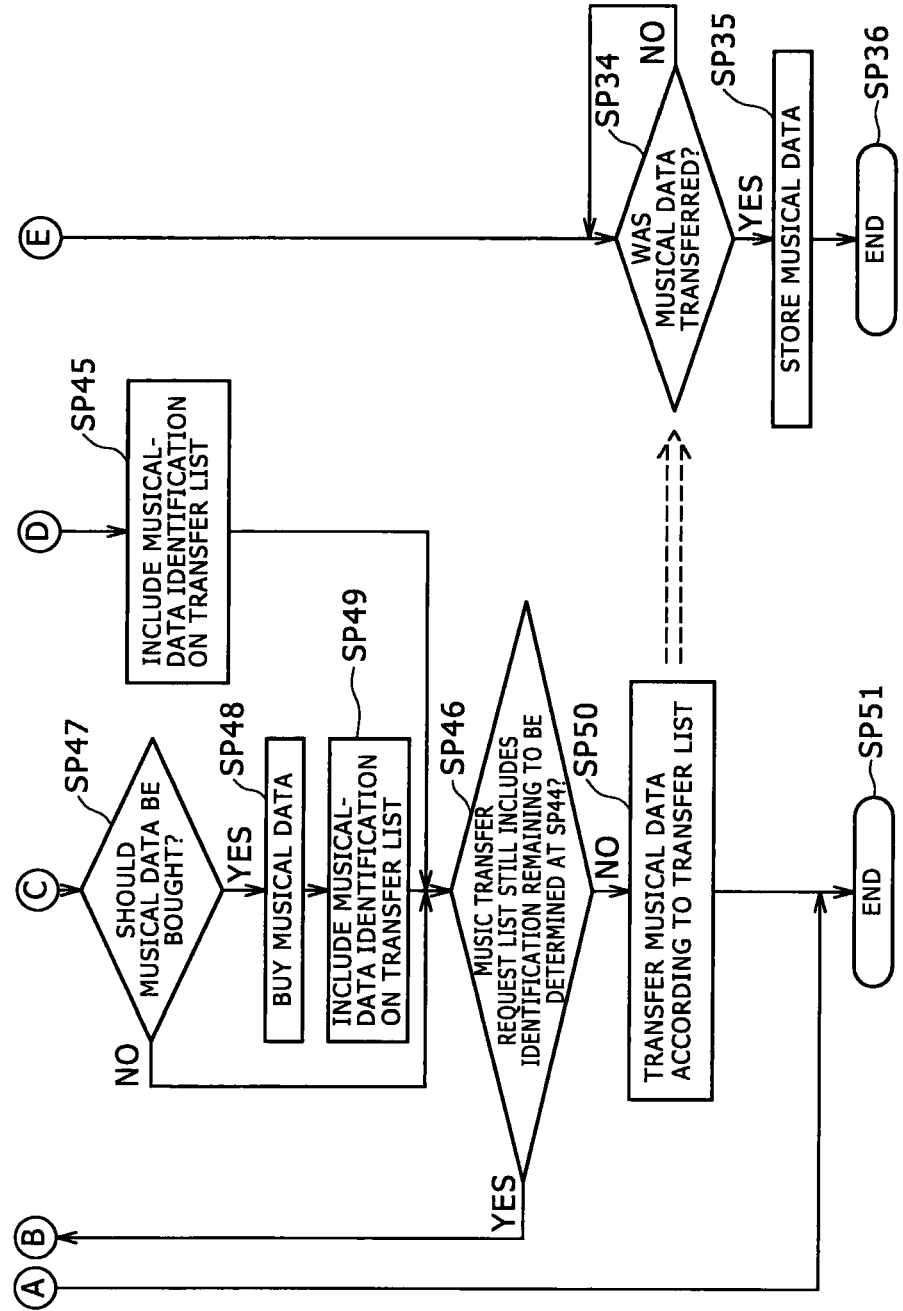

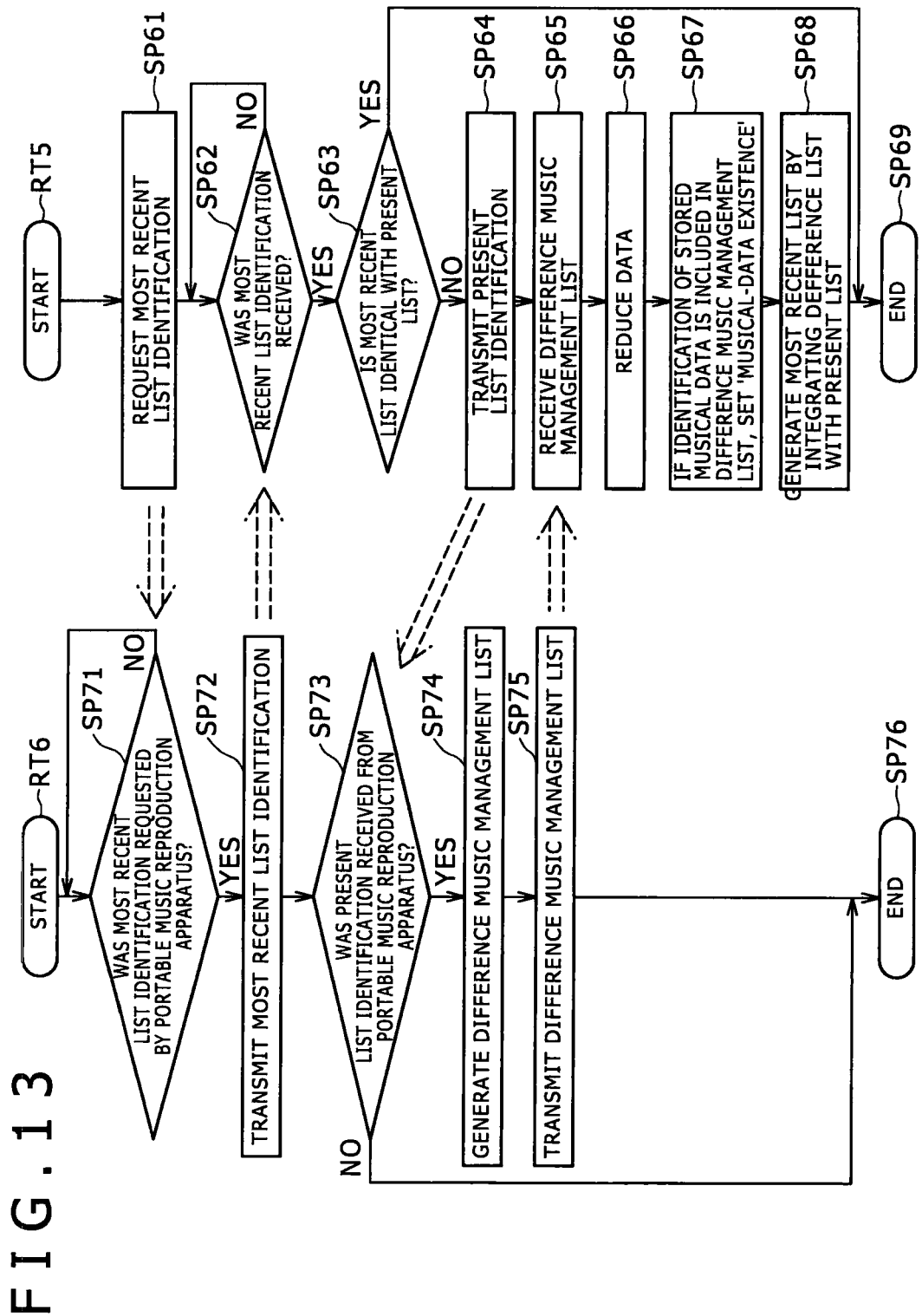

FIG.14

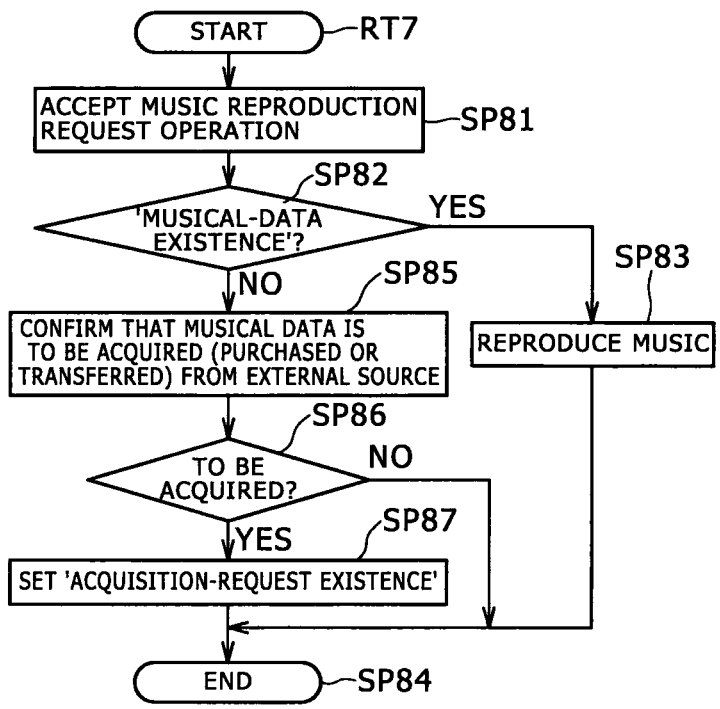

FIG.15

| LIST INFORMATION | | MUSIC MANAGEMENT LIST IDENTIFICATION | |
|---|---|---|---|
| ID | MUSICAL-DATA RELATED INFORMATION | TRIAL DATA | MUSICAL-DATA STATUS |
| ID | MUSICAL-DATA RELATED INFORMATION | TRIAL DATA | MUSICAL-DATA STATUS |
| ID | MUSICAL-DATA RELATED INFORMATION | TRIAL DATA | MUSICAL-DATA STATUS |
| ID | MUSICAL-DATA RELATED INFORMATION | TRIAL DATA | MUSICAL-DATA STATUS |
| ID | MUSICAL-DATA RELATED INFORMATION | TRIAL DATA | MUSICAL-DATA STATUS |

| MUSICAL-DATA EXISTENCE/ NON-EXISTENCE | TRANSFER-REQUEST EXISTENCE/ NON-EXISTENCE | PURCHASE-REQUEST EXISTENCE/ NON-EXISTENCE |

FIG. 18

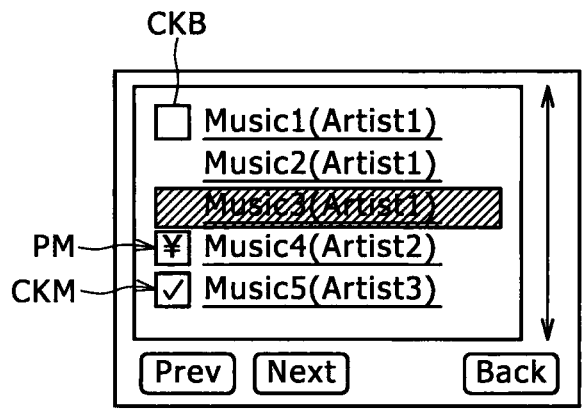

| LIST INFORMATION | | MUSIC MANAGEMENT LIST IDENTIFICATION |
|---|---|---|
| MUSICAL-DATA IDENTIFICATION | MUSICAL-DATA RELATED INFORMATION | MUSICAL-DATA STATUS |
| MUSICAL-DATA IDENTIFICATION | MUSICAL-DATA RELATED INFORMATION | MUSICAL-DATA STATUS |
| MUSICAL-DATA IDENTIFICATION | MUSICAL-DATA RELATED INFORMATION | MUSICAL-DATA STATUS |
| MUSICAL-DATA IDENTIFICATION | MUSICAL-DATA RELATED INFORMATION | MUSICAL-DATA STATUS |
| MUSICAL-DATA IDENTIFICATION | MUSICAL-DATA RELATED INFORMATION | MUSICAL-DATA STATUS |

FIG. 19B

MUSICAL-DATA IDENTIFICATION

| CONTENT ID | ID LINK | ID LINK | END DATA |
|---|---|---|---|

# CONTENT ACQUISITION APPARATUS, CONTENT ACQUISITION METHOD AND CONTENT ACQUISITION PROGRAM

CROSS REFERENCES TO RELATED APPLICATIONS

This is a continuation of application Ser. No. 11/474,940, filed Jun. 27, 2006 which issued on Mar. 23, 2010 as U.S. Pat. No. 7,685,225), which claims the benefit of Japanese Application Nos. JP 2005-190489 and JP 2005-268619, the entire contents of which are incorporated herein by reference in their entirety.

The present invention contains subject matter related to Japanese Patent Application JP 2005-190489, filed in the Japanese Patent Office on Jun. 29, 2005, and Japanese Patent Application JP 2005-268619, filed in the Japanese Patent Office on Sep. 15, 2005, the entire contents of which being incorporated herein by reference.

BACKGROUND OF THE INVENTION

The present invention relates to a content acquisition apparatus, a content acquisition method and a content acquisition program. The present invention can be suitably applied to, for example, a music transfer system for transferring musical data from a music storage apparatus for storing musical data to a music reproduction apparatus.

In the past, in an operation carried out by the user to select musical data to be transferred from a music storage apparatus to a music reproduction apparatus in the conventional music transfer system, the music transfer system of this type reproduced a transfer list showing information on musical-data identifications used for identifying musical data including the selected musical data. Then, with the music reproduction apparatus connected to the music storage apparatus, the musical data identified by the musical-data identification included in the reproduced transfer list was transferred from the music storage apparatus to the music reproduction apparatus. In addition, in accordance with the music transfer system, the music reproduction apparatus can be requested to acquire musical data. For more information, the reader is suggested to refer to a document such as patent reference 1, which is Japanese Patent Laid-open No. 2001-93226.

SUMMARY OF THE INVENTION

By the way, in accordance with the conventional music transfer system having the configuration described above, if the amount of existing musical data transferable from a music storage apparatus to a music reproduction apparatus is large, the user must create a transfer list by searching the existing musical data stored in the music storage apparatus as data of such a large amount for musical data that has not been stored yet in the music reproduction apparatus, and such an operation to search musical data of such a large amount is troublesome. Thus, the conventional music transfer system raises a problem that the music reproduction apparatus cannot be requested to efficiently acquire musical data from the music storage apparatus.

In order to solve the problem described above, inventors of the present invention have proposed a content acquisition apparatus, a content acquisition method and a content acquisition program, which are capable of acquiring a content from a content providing apparatus in a remarkably efficient manner.

A content acquisition apparatus provided by the present invention as an apparatus for solving the problem described above includes: content storage means for storing contents; output means for outputting identifications of contents that can be presented by a content providing apparatus for presenting contents; and content acquisition means for acquiring a content, which is identified by a content identification selected by carrying out an operation to select one of identifications output by the output means, from the content providing apparatus, wherein the output means outputs identifications of contents not stored yet in the content storage means as identifications different from other identifications output as identifications of other contents already stored in the content storage means.

Thus, when the user selects the identification of a content to be acquired from the content providing apparatus among content identifications output by the output means, the user is capable of easily distinguishing the identifications of contents not stored yet in the content storage means employed in the content acquisition apparatus and the identifications of other contents already stored in the content storage means from each other because the identifications of the contents not stored yet in the content storage means are displayed as identifications different from the identifications of the other contents already stored in the content storage means, and thus also easily capable of identifying a content to be acquired from the content providing apparatus.

In accordance with the present invention, when the user selects the identification of a content to be acquired from the content providing apparatus among content identifications output by the output means, the user is capable of easily distinguishing the identifications of contents not stored yet in the content storage unit employed in a content acquisition apparatus and the identifications of other contents already stored in the content storage means from each other because the identifications of the contents not stored yet in the content storage means are displayed as identifications different from the identifications of the other contents already stored in the content storage means, and thus also easily capable of identifying a content to be acquired from the content providing apparatus. As a result, a content can be acquired from the content providing apparatus in a remarkably efficient manner.

BRIEF DESCRIPTION OF THE DRAWINGS

FIG. 4 is a diagram showing the configuration of a portable music reproduction apparatus in a simple manner;

FIG. 5 is a diagram showing the configuration of a music providing server in a simple manner;

FIG. 6 is a simplified explanatory diagram referred to in description of a music management list;

FIG. 7 is a simplified explanatory diagram referred to in description of propagation of a music management list;

FIG. 11 shows a flowchart representing the procedure of music transfer/purchasing processing;

FIG. 12 shows a flowchart representing the procedure of music transfer/purchasing processing;

FIG. 13 shows a flowchart representing the procedure of list updating processing;

FIG. 14 shows a flowchart representing the procedure of processing carried out to reproduce a piece of musical data;

FIG. 15 is a simplified explanatory diagram referred to in description of a music management list according to another embodiment;

FIG. 18 is a simplified explanatory diagram referred to in description of a first acquired-music select screen according to another embodiment;

FIG. 19 is a simplified explanatory diagram referred to in description of another music management list according to a further embodiment;

DETAILED DESCRIPTION OF THE PREFERRED EMBODIMENTS

An embodiment of the present invention is explained by referring to diagrams as follows.

(1): Outline

Figure 1:
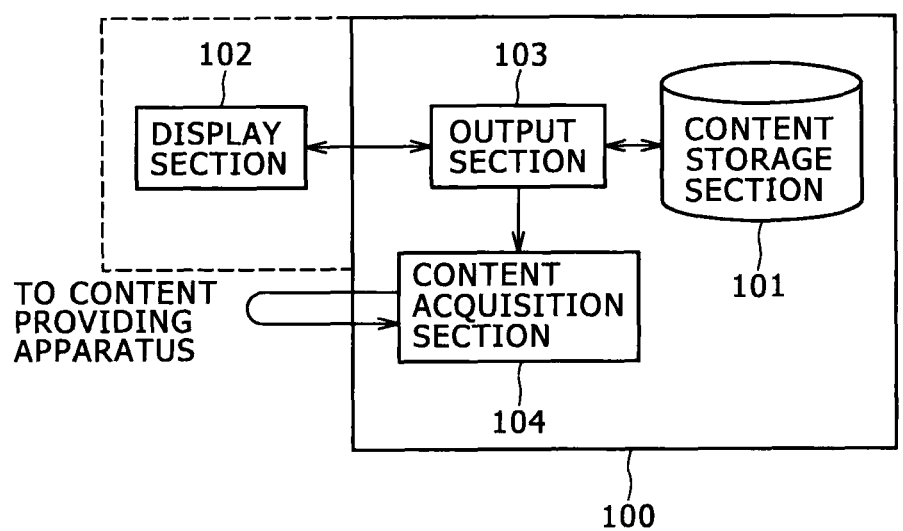
FIG. 1 is a diagram showing an outline of a content acquisition apparatus in a simple manner.

An outline of an embodiment is explained by referring to FIG. 1. By the way, after the outline of the embodiment is explained, the embodiment itself will be described concretely.

A content acquisition apparatus 100 shown in FIG. 1 has: a content storage section 101 used for storing contents; an output section 103 for outputting identifications of contents, which are transferable from a content providing apparatus for providing contents, to a display section 102; and a content acquisition section 104 for acquiring a content, which is identified by an identification selected by carrying out an operation to select one of identifications displayed by the output section 103 on the display section 102, from the content providing apparatus. By the way, the display section 102 can be fixed on the content acquisition apparatus 100 or provided on the content acquisition apparatus 100 in such a way that the display section 102 can be removed from the content acquisition apparatus 100. As an alternative, the display section 102 can be provided on an apparatus different from the content acquisition apparatus 100.

In addition, the output section 103 outputs identifications of contents not stored yet in the content storage unit 101 to the display section 102 by indicating that the contents have not been stored yet in the content storage unit 101, and outputs identifications of other contents already stored in the content storage unit 101 to the display section 102 by indicating that the other contents have already been stored in the content storage unit 101.

(2): Configuration of a Music Purchasing/Transferring System

Figure 2:
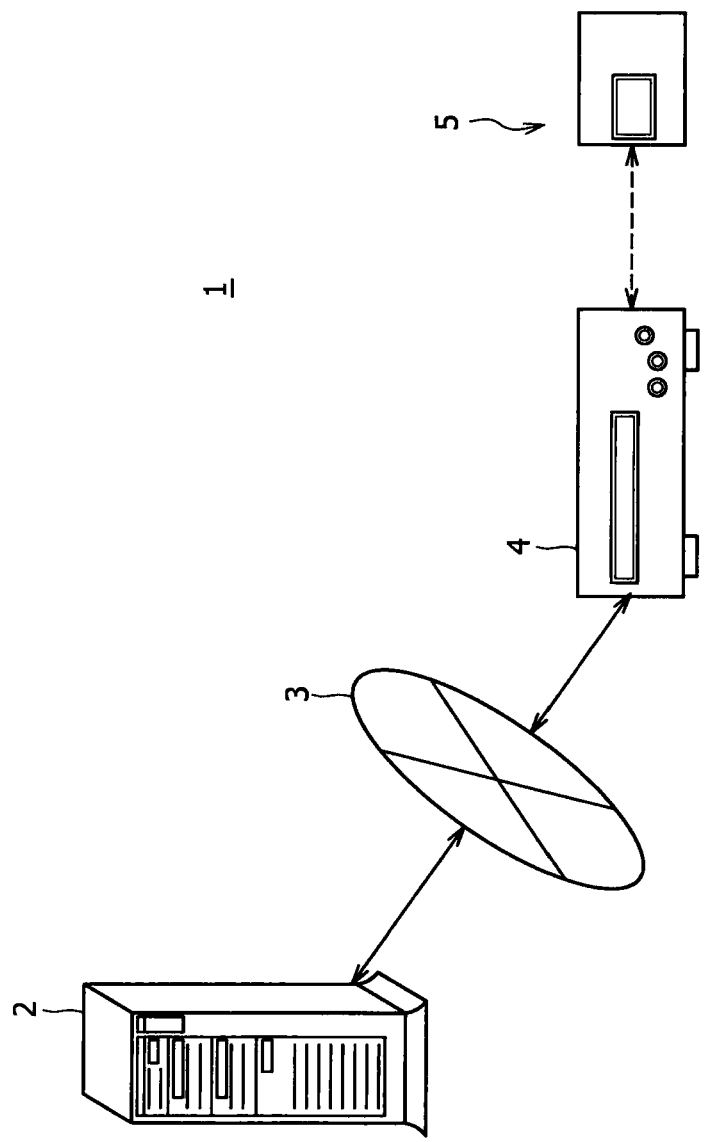
FIG. 2 is a diagram showing the configuration of a music purchasing/transferring system according to an embodiment in a simple manner.

FIG. 2 is a diagram showing an entire music purchasing/transferring system 1. As shown in the figure, the music purchasing/transferring system 1 includes: a music providing server 2 for providing musical data; a music reproduction terminal 4 for receiving musical data provided by the music providing server 2 by way of a network 3 and storing the musical data; and a portable music reproduction apparatus 5 used for receiving and storing musical data, which has been stored in the music reproduction terminal 4 and is transmitted by the music reproduction terminal 4 with the portable music reproduction apparatus 5 connected to the music reproduction terminal 4.

Figure 3:
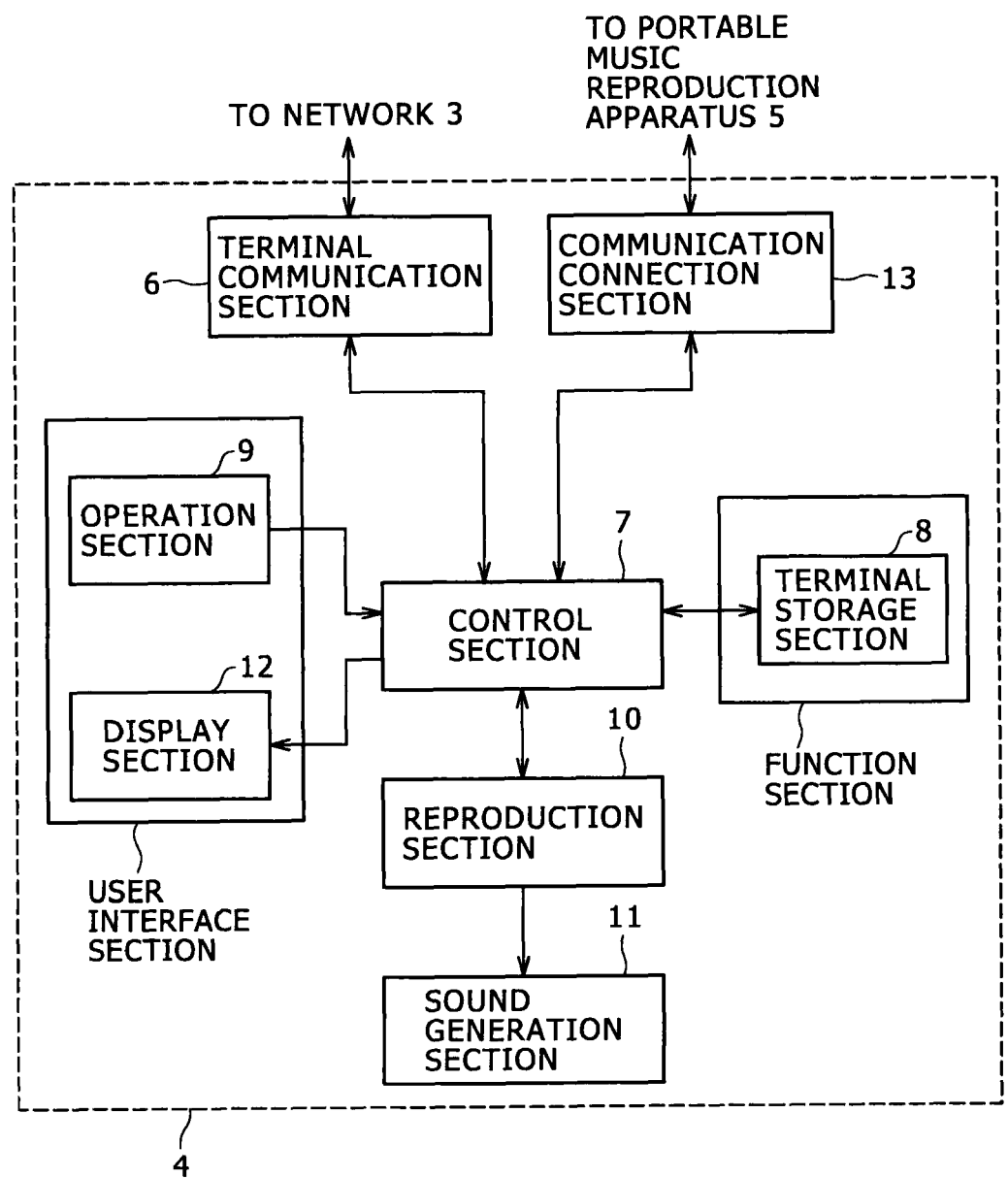
FIG. 3 is a diagram showing the configuration of a music reproduction terminal in a simple manner.

As shown in FIG. 3, the music reproduction terminal 4 typically includes a terminal communication section 6, a control section 7, a terminal storage section 8, a operation section 9, a reproduction section 10, a sound generation section 11, a display section 12 and a communication connection section 13. The terminal communication section 6 is an element for receiving musical data provided by the music providing server 2 by way of the network 3. The control section 7 is an element for controlling the music reproduction terminal 4 as a whole in an integrated manner. When the terminal communication section 6 receives musical data from the music providing server 2, the control section 7 stores the data in the terminal storage section 8. When the operation section 9 is operated by the user in order to reproduce musical data, the control section 7 reads out the data from the terminal storage section 8 in accordance with the operation whereas the reproduction section 10 carries out a process to reproduce the data to be output by the sound generation section 11. In addition, the control section 7 also displays information on the musical data being reproduced on the display section 12. The information includes the names of artists for the musical data and the title of the data. With the portable music reproduction apparatus 5 connected to the music reproduction terminal 4 by a wire or radio communication technique, the control section 7 is capable of transmitting musical data stored in the terminal storage section 8 to the portable music reproduction apparatus 5 by way of the communication connection section 13.

As shown in FIG. 4, the portable music reproduction apparatus 5 typically includes a communication connection section 14, a control section 15, a storage section (hereinafter referred to as a portable storage section) 16, an operation section 17, a reproduction section 18, a sound generation section 19 and a display section 20. The communication connection section 14 is an element for receiving musical data provided by the music reproduction terminal 4 to which the portable music reproduction apparatus 5 is connected. The control section 15 is an element for controlling the portable music reproduction apparatus 5 as a whole in an integrated manner. When the communication connection section 14 receives musical data from the music reproduction terminal 4, the control section 15 stores the data in a portable storage section 16. When the operation section 17 is operated by the user to reproduce musical data, the control section 15 reads out the data from the portable storage section 16 in accordance with the operation whereas the reproduction section 18 carries out a process to reproduce the data to be output by the sound generation section 19. In addition, the control section 15 also displays information on the musical data being reproduced on the display section 20. The information includes the names of artists for the musical data and the title of the data.

By the way, as shown typically in FIG. 5, the music providing server 2 according to this embodiment includes a server storage section 21 used for storing a plurality of pieces of musical data and management information used for managing the pieces of musical data. The pieces of musical data are each to be provided to the music reproduction terminal 4 with a charge. The management information is also referred to hereafter as a music management list.

The format of the music management list is explained as follows. As shown in FIG. 6A, for example, the music management list L1 includes music management list identification used for identifying the music management list L1. On each row of the music management list L1, the music management list L1 also includes an ID, a musical-data related information and musical data status, which are associated with a piece of musical data. The ID is an identification used for identifying the piece of musical data. The musical-data related information is information related to the piece of musical data. Examples of the musical-data related information are the names of artists associated with the piece of musical data, the name of an album including the piece of musical data and a picture of a jacket for the album. The musical data status is the status of the piece of musical data.

As shown in FIG. 6B, the musical data status consists of musical-data existence/non-existence information and acquisition-request existence/non-existence information. The musical-data existence/non-existence information is information indicating whether or not the piece of musical data has been stored in an apparatus used for storing the music management list L1. Examples of the apparatus used for storing the music management list L1 are the music providing server 2, the music reproduction terminal 4 and the portable music reproduction apparatus 5. On the other hand, the acquisition-request existence/non-existence information is information indicating whether or not a request has been received from an external requester as a request to acquire the piece of musical data. By the way, for the sake of convenience in the following description, musical-data existence/non-existence information indicating that the piece of musical data has been stored in the apparatus is referred to as 'musical-data existence'. On the other hand, musical-data existence/non-existence information indicating that the piece of musical data has not been stored in the apparatus is referred to as 'musical-data non-existence'. By the same token, acquisition-request existence/non-existence information indicating that a request has been received from an external requester as a request to acquire the piece of musical data is referred to as 'acquisition-request existence'. On the other hand, acquisition-request existence/non-existence information indicating that a request has not been received from an external requester as a request to acquire the piece of musical data is referred to as 'acquisition-request non-existence'.

Thus, the server storage section 21 employed in the music providing server 2 is used for storing pieces of musical data and a music management list L1. Each row of the music management list L1 includes a musical-data ID, a musical-data related information and musical data status, which are associated with each other, for every piece of musical data. The musical data status includes 'musical-data existence' and 'acquisition-request non-existence'.

When a new piece of musical data is added to the server storage section 21 employed in the music providing server 2, a control section 22 employed in the music providing server 2 as a controller for controlling the music providing server 2 as a whole in an integrated manner adds a new row to the music management list L1 as a row including a musical-data ID, musical-data related information and musical data status, which are associated with each other, for the new piece of musical data. The musical data status consists of as 'musical-data existence' and 'acquisition-request non-existence'. In this way, a new music management list L1 is created and stored in the server storage section 21. In this case, the control section 22 includes a music management list identification in the new music management list L1 as music management list identification different from the music management list identification of the previous music management list L1. By the way, in the case of this embodiment, the music management list identification in the new music management list L1 is a version used for identifying old/new generations of the new music management list L1.

For example, when the music reproduction terminal 4 transmits a request for a communication connection to the music providing server 2, the control section 22 employed in the music providing server 2 establishes a communication connection with the music reproduction terminal 4 through a server communication section 23 also employed in the music providing server 2 and the network 3 in accordance with the request. In addition, the music providing server 2 also transmits the most recent music management list L1 stored in the server storage section 21 to the music reproduction terminal 4 as shown conceptually in FIG. 7 to be stored in the terminal storage section 8 employed in the music reproduction terminal 4. In this way, the music reproduction terminal 4 is capable of obtaining the music management list L1 showing a musical-data ID, musical-data related information and musical-data status, which are associated with each other, for every piece of musical data stored in the music providing server 2. If the musical-data identification of musical data already stored in the terminal storage section 8 is included on the music management list L1 received from the music providing server 2, the control section 7 employed in the music reproduction terminal 4 changes the musical-data status associated with the musical-data identification cataloged on the music management list L1 to 'musical-data existence'. By the way, in the case of this embodiment, the music reproduction terminal 4 reduces the amount of information stored on the music management list L1 received from the music providing server 2 as described above to a quantity smaller than the amount of information stored in the music providing server 2 before storing the music management list L1 in the terminal storage section 8. The music reproduction terminal 4 reduces the amount of information stored on the music management list L1 received from the music providing server 2 by, for example, eliminating some of the musical-data related information from the music management list L1.

With the portable music reproduction apparatus 5 connected to the music reproduction terminal 4 by a wire or radio communication technique, the control section 7 employed in the music reproduction terminal 4 is capable of transmitting the music management list L1 stored in the terminal storage section 8 to the portable music reproduction apparatus 5 to be stored in the portable storage section 16 employed in the portable music reproduction apparatus 5. In this way, the portable music reproduction apparatus 5 is capable of acquiring the music management list L1 showing a musical-data ID, musical-data related information and musical-data status, which are associated with each other, for every piece of musical data stored in the music providing server 2. If the musical-data identification of musical data already stored in the portable storage section 16 is included on the music management list L1 received from the music reproduction terminal 4, the control section 15 employed in the portable music reproduction apparatus 5 changes the musical-data status associated with the musical-data identification cataloged on the music management list L1 to 'musical-data existence'. By the way, in the case of this embodiment, the portable music reproduction apparatus 5 reduces the amount of information stored on the music management list L1 received from the music reproduction terminal 4 as described above to a quantity smaller than the amount of information stored in the music reproduction terminal 4 before storing the music management list L1 in the portable storage section 16. The portable music reproduction apparatus 5 reduces the amount of information stored on the music management list L1 received from the music reproduction terminal 4 by, for example, eliminating some of the musical-data related information from the music management list L1.

Figure 8A:
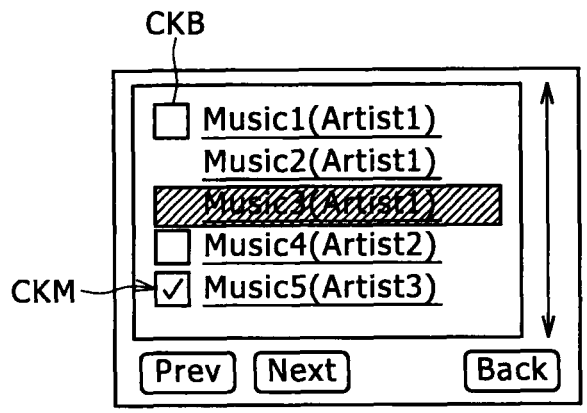
FIG. 8 is a simplified explanatory diagram referred to in description of an acquired-music select screen.

With the music management list L1, on the basis of the stored L1, the music reproduction terminal 4 is capable of carrying out a process to display an acquired-music select screen like one shown in FIG. 8A as a screen used for selecting an acquired piece of musical data. By the same token, with the music management list L1, on the basis of the stored L1, the portable music reproduction terminal 5 is capable of carrying out a process to display an acquired-music select screen like one shown in FIG. 8A as a screen used for selecting an acquired piece of musical data.

Figure 9:
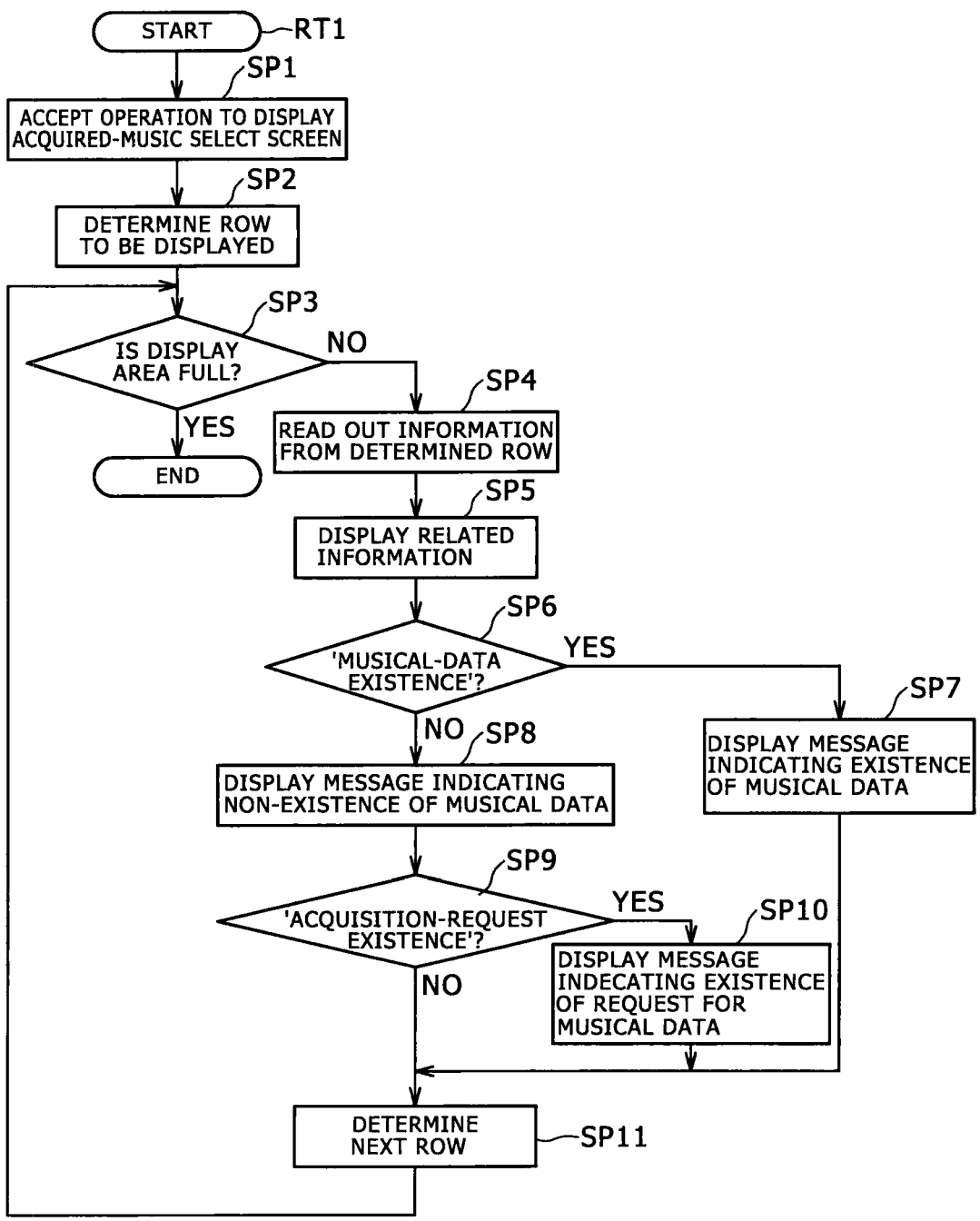
FIG. 9 shows a flowchart representing the procedure of processing carried out to display an acquired-music select screen.

Next, by referring to a flowchart shown in FIG. 9, the following description explains the procedure RT1 of processing carried out by the portable music reproduction apparatus 5 as processing to display an acquired-music select screen. It is to be noted that, of course, the music reproduction terminal 4 is also capable of executing the procedure RT1 of the processing to display an acquired-music select screen.

The flowchart begins with a step SP1 at which the control section 15 employed in the portable music reproduction apparatus 5 receives a signal indicating that an operation has been carried out by the user to make a request for processing to display an acquired-music select screen. Then, the flow of the procedure RT1 goes on to the next step SP2 at which the control section 15 identifies a row of the music management list L1 as a row to be displayed. An example of the row, the information stored on which is to be displayed, is the first row of the music management list L1 stored in the portable storage section 16. As described before, the music management list L1 is shown in FIG. 6A.

Then, the flow of the procedure RT1 goes on to the next step SP3 at which the control section 15 employed in the portable music reproduction apparatus 5 produces a result of determination as to whether or not something has been displayed on the display section 20 of the portable music reproduction apparatus 5. If the result of the determination indicates that nothing has been displayed on the display section 20, the flow of the procedure RT1 goes on to a step SP4. At the step SP4, the control section 15 refers to, for example, the first row the music management list L1 as a row to be displayed and reads out musical-data related information and musical-data status, which are associated with the identification of musical data, from the first row.

Then, the flow of the procedure RT1 goes on to the next step SP5 at which the control section 15 employed in the portable music reproduction apparatus 5 displays the musical-data related information read out from the row on the display section 20. Subsequently, the flow of the procedure RT1 goes on to the next step SP6. As described before, examples of the musical-data related information of musical data are the title of the musical data and the names of artists for the musical data.

At the step SP6, the control section 15 employed in the portable music reproduction apparatus 5 produces a result of determination as to whether or not the musical-data status read out from the row is the 'musical-data existence'.

An affirmation determination result obtained at the step SP6 indicates that musical data identified by the musical-data identification included in the first row on the music management list L1 has been stored in the portable storage section 16 employed in the portable music reproduction apparatus 5. In this case, the flow of the procedure RT1 goes on to a step SP7 at which the control section 15 employed in the portable music reproduction apparatus 5 keeps the state obtained at the step SP5 as a state of displaying only the musical-data related information. In this way, the user is informed of the fact that musical data identified by the musical-data identification included in the first row on the music management list L1 exists in the portable music reproduction apparatus 5. Then, the flow of the procedure RT1 goes on to the next step SP11.

On the other hand, a negation determination result obtained at the step SP6 indicates that musical data identified by the musical-data identification included in the first row on the music management list L1 has not been stored in the portable storage section 16. In this case, the flow of the procedure RT1 goes on to a step SP8 at which the control section 15 employed in the portable music reproduction apparatus 5 displays a checkbox CKB associated with the musical-data related information displayed at the step SP5. In this way, the user is informed of the fact that musical data identified by the musical-data identification included in the first row on the music management list L1 does not exist in the portable music reproduction apparatus 5. Then, the flow of the procedure RT1 goes on to the next step SP9.

At the step SP9, the control section 15 employed in the portable music reproduction apparatus 5 produces a result of determination as to whether or not the musical-data status read out from the row includes the 'acquisition-request existence'.

An affirmation determination result obtained at the step SP9 indicates that a request has been made by an external requester as a request for acquisition of musical data identified by the musical-data identification included in the first row on the music management list L1. In this case, the flow of the procedure RT1 goes on to a step SP10 at which the control section 15 employed in the portable music reproduction apparatus 5 displays a checkmark CKM inside the checkbox CKB displayed at the step SP8. In this way, the user is informed of the fact that a request for acquisition of the musical data has been made. Then, the flow of the procedure RT1 goes on to the next step SP11.

On the other hand, a negation determination result obtained at the step SP9 indicates that no request has been made by an external requester as a request for acquisition of musical data identified by the musical-data identification included in the first row on the music management list L1. In this case, the control section 15 employed in the portable music reproduction apparatus 5 continues the procedure RT1 to the step SP11 directly.

At the step SP11, the control section 15 employed in the portable music reproduction apparatus 5 identifies a row of the music management list L1 as a row the information recorded on which is to be displayed next. Then, the flow of the procedure RT1 goes back to the step SP3. By carrying out the processes of the steps SP3 to SP11 repeatedly, the control section 15 employed in the portable music reproduction apparatus 5 reads out as many rows of the music management list L1 as those in a displayable range and displays the rows on the display section 20 of the portable music reproduction apparatus 5.

Figure 10:
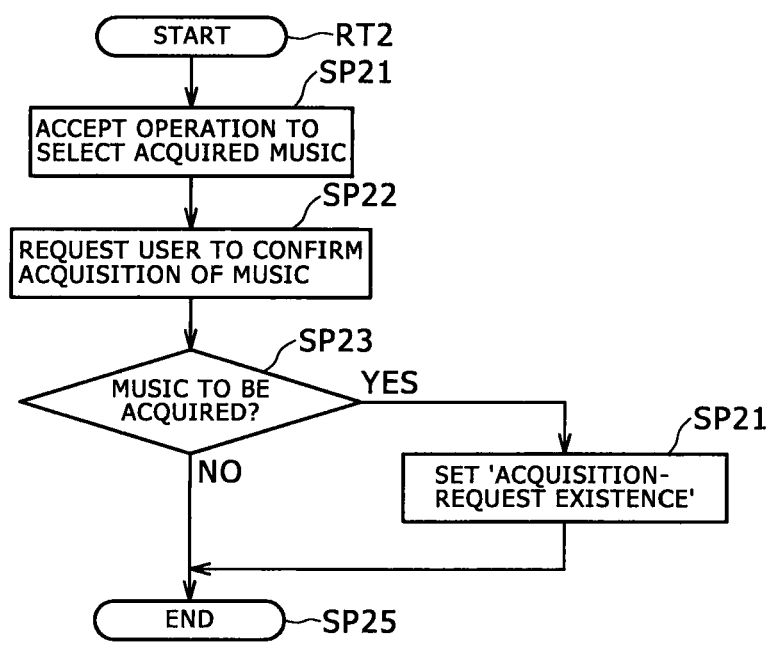
FIG. 10 shows a flowchart representing the procedure of processing to select an acquired piece of musical data.

The following description explains processing to select an acquired piece of musical data through the screen used to select an acquired piece of musical data in accordance with a request made by an external requester. As an example, the following description explains processing carried out by the portable music reproduction apparatus 5 to select an acquired piece of musical data. The processing is explained by referring to a flowchart shown in FIG. 10 as a flowchart representing the procedure RT2 of the processing. It is to be noted that, of course, the music reproduction terminal 4 is also capable of executing the procedure RT2 of the processing to display an acquired-music select screen.

The flowchart begins with a step SP21 at which the control section 15 employed in the portable music reproduction apparatus 5 receives a signal indicating that an operation has been carried out by the user to select an acquired piece of musical data by putting a checkmark CKM on a checkbox CKB displayed on the acquired-music select screen appearing on the display section 20 of the portable music reproduction apparatus 5 as a checkbox CKB associated with the acquired piece of musical data. Then, the flow of the procedure RT2 goes on to the next step SP22 at which the control section 15 displays a confirmation message on the display section 20 of the portable music reproduction apparatus 5. The confirmation message is used for producing a result of determination as to whether or not the musical data selected by typically carrying out the operation to select an acquired piece of musical data may be acquired. Then, the flow of the procedure RT2 goes on to the next step SP23 to produce a result of determination as to whether or not the piece of musical data may be acquired.

By the way, in the case of this embodiment, the music reproduction terminal 4 acquires a piece of musical data with a charge from the music providing server 2 by way of the network 3. If the acquired-music select processing procedure RT2 is executed by the music reproduction terminal 4, in particular, the process of the step SP21 can be carried out for requesting the user to confirm that the piece of musical data may be acquired with a charge.

If the user confirms that the piece of musical data can be acquired with a charge as evidenced by an operation carried out by the user to allow the piece of musical data to be acquired, the determination result produced by the control section 15 employed in the portable music reproduction apparatus 5 at the step SP23 is an affirmation result. In this case, the flow of the procedure RT2 goes on to a step SP24 at which the control section 15 searches the music management list L1 stored in the portable storage section 16 for musical-data status having its checkbox CKB marked with a checkmark CKM, and sets the musical-data status found in the search process at the 'acquisition-request existence'.

If the user does not confirm that the piece of musical data can be acquired with a charge as evidenced by no operation carried out by the user to allow the piece of musical data to be acquired, on the other hand, the determination result produced by the control section 15 at the step SP23 is a negation result. In this case, the control section 15 keeps the musical-data status of the piece of musical data at the 'acquisition-request non-existence'. In either case, the flow of the procedure RT2 finally goes on to a step SP25 at which the execution of the acquired-music select processing procedure RT2 is ended.

As described above, a piece of musical data can be selected through an acquired-music select screen as a piece of musical data to be acquired by the portable music reproduction apparatus 5 from an external apparatus, which is the music reproduction terminal 4 in this case.

Next, by referring to a flowchart shown in FIGS. 11 and 12, the following description explains procedures of transfer/purchase processing carried out to transfer a piece of musical data from the music reproduction terminal 4 to the portable music reproduction apparatus 5. By the way, the transfer/purchase processing carried out to transfer pieces of musical data from the music reproduction terminal 4 to the portable music reproduction apparatus 5 is explained by dividing the processing into the procedure RT3 of processing carried out by the portable music reproduction apparatus 5 to make a request for a transfer of pieces of musical data from the music reproduction terminal 4 to the portable music reproduction apparatus 5 and the procedure RT4 of processing carried out by the music reproduction terminal 4 to transfer purchased pieces of musical data from the music reproduction terminal 4 to the portable music reproduction apparatus 5.

The procedure RT3 of the processing carried out by the portable music reproduction apparatus 5 to make a request for a transfer of pieces of musical data from the music reproduction terminal 4 to the portable music reproduction apparatus 5 begins with a step SP31 at which the control section 15 employed in the portable music reproduction apparatus 5 produces a result of determination as to whether or not the portable music reproduction apparatus 5 has been connected to the music reproduction terminal 4 by a wire or radio communication technique. If the result of the determination indicates that the portable music reproduction apparatus 5 has been connected to the music reproduction terminal 4, the flow of the processing goes on to the next step SP32.

The music management list L1 stored in the portable music reproduction apparatus 5 may be less recent than the music management list L1 stored in the music reproduction terminal 4. In this case, at the step SP32, the control section 15 employed in portable music reproduction apparatus 5 acquires a difference music management list, which is the difference between the music management list L1 stored in the portable music reproduction apparatus 5 and the music management list L1 stored in the music reproduction terminal 4, from the music reproduction terminal 4. The difference represents a new portion included in the music management list L1 stored in the music reproduction terminal 4 but not included in the music management list L1 stored in the portable music reproduction apparatus 5. Then, the control section 15 employed in portable music reproduction apparatus 5 integrates the difference with the music management list L1 already stored in the portable music reproduction apparatus 5 in order to update the music management list L1 already stored in the portable music reproduction apparatus 5 into the most recent music management list L1. The process to update a music management list will be described later in detail.

Then, at the next step SP33, the control section 15 employed in the portable music reproduction apparatus 5 searches musical-data status on the music management list L1 stored in the portable music reproduction apparatus 5 for musical-data status set at the 'acquisition-request existence' and creates a music transfer request list showing musical-data identifications associated with the musical-data status found in the search process, transmitting the created music transfer request list to the music reproduction terminal 4. Typically, the music transfer request list shows a plurality of such musical-data identifications.

Then, at the next step SP34, the control section 15 employed in the portable music reproduction apparatus 5 produces a result of determination as to whether or not pieces of musical data have been received from the music reproduction terminal 4. If the result of the determination is an affirmation result, the flow of the procedure RT3 goes on to the next step SP35 at which the control section 15 stores the pieces of musical data in the portable storage section 16. Finally, the flow of the procedure RT3 then goes on to the last step SP36 at which the control section 15 ends the execution of the music transfer request processing procedure RT3. In this way, when the portable music reproduction apparatus 5 is connected to the music reproduction terminal 4, the portable music reproduction apparatus 5 is capable of acquiring musical data, the acquisition of which has been requested by the user in advance from the music reproduction terminal 4.

In the mean time, the music purchasing/transfer processing procedure RT4 starts with a step SP41 at which the control section 7 employed in the music reproduction terminal 4 produces a result of determination as to whether or not the portable music reproduction apparatus 5 has been connected to the music reproduction terminal 4 by a wire or radio communication technique. If the result of the determination indicates that the portable music reproduction apparatus 5 has been connected to the music reproduction terminal 4, the flow of the processing goes on to the next step SP42.

As described earlier, the music management list L1 stored in the portable music reproduction apparatus 5 may be less recent than the music management list L1 stored in the music reproduction terminal 4. In this case, at the step SP42, the control section 7 employed in music reproduction terminal 4 transmits a difference music management list, which is the difference between the music management list L1 stored in the portable music reproduction apparatus 5 and the music management list L1 stored in the music reproduction terminal 4, to the portable music reproduction apparatus 5. The difference represents a new portion included in the music management list L1 stored in the music reproduction terminal 4 but not included in the music management list L1 stored in the portable music reproduction apparatus 5. Then, the control section 15 employed in portable music reproduction apparatus 5 integrates the difference with the music management list L1 already stored in the portable music reproduction apparatus 5 in order to update the music management list L1 already stored in the portable music reproduction apparatus 5 into the most recent music management list L1. As mentioned earlier, the process to update a music management list will be described later in detail.

Then, the flow of the procedure RT4 goes on to the next step SP43 at which the control section 7 employed in music reproduction terminal 4 produces a result of determination as to whether or not the music reproduction terminal 4 has received a music transfer request list from the portable music reproduction apparatus 5. If the result of the determination is an affirmation result, the flow of the procedure RT4 goes on to the next step SP44 at which the control section 7 employed in the music reproduction terminal 4 produces a result of determination as to whether or not a piece of musical data identified by a specific musical-data identification included on the music transfer request list received from the portable music reproduction apparatus 5 has been stored in the terminal storage section 8. In order to produce such a result of determination, the control section 7 employed in music reproduction terminal 4 must search the music transfer request list for the specific musical-data identification. Initially, the control section 7 employed in music reproduction terminal 4 searches the music transfer request list for the first musical-data identification on the list.

An affirmation determination result produced at the step SP44 indicates that the piece of musical data identified by the musical-data identification found in the search process as a piece of musical data to be transferred to the portable music reproduction apparatus 5 as requested by the portable music reproduction apparatus 5 has been stored in the music reproduction terminal 4. In this case, the flow of the procedure RT4 goes on to a step SP45 at which the control section 7 employed in the music reproduction terminal 4 includes the musical-data identification on a transfer list showing musical-data identifications identifying pieces of musical data to be transmitted to the portable music reproduction apparatus 5. After the musical-data identification is included on the transfer list, the flow of the procedure RT4 goes on to the next step SP46.

At the step SP46, the control section 7 employed in the music reproduction terminal 4 produces a result of determination as to whether or not the music transfer request list received from the portable music reproduction apparatus 5 still includes a musical-data identification not experiencing yet the determination process carried out at the step SP44 as a process of determination as to whether or not the piece of musical data identified by the musical-data identification has been stored in the terminal storage section 8.

If the determination result produced at the step SP46 is an affirmation result, the flow of the procedure RT4 goes back to the step SP44 at which the control section 7 employed in the music reproduction terminal 4 produces a result of determination as to whether or not the second piece of musical data identified by the musical-data identification included on the music transfer request list received from the portable music reproduction apparatus 5 has been stored in the terminal storage section 8.

On the other hand, a negation determination result produced at the step SP44 indicates that the second piece of musical data identified by the musical-data identification included on the music transfer request list received from the portable music reproduction apparatus 5 has not been stored in the terminal storage section 8 employed in the music reproduction terminal 4. In this case, the control section 7 employed in the music reproduction terminal 4 continues the procedure RT4 to a step SP47.

At the step SP47, the control section 7 employed in the music reproduction terminal 4 displays a query on the display section 12 of the music reproduction terminal 4 as a query of confirmation as to whether or not the piece of musical data identified as a piece of musical data not stored yet in the terminal storage section 8 may be purchased from the music providing server 2. If the user carries out an operation to indicate that the piece of musical data should not be purchased from the music providing server 2, the control section 7 regards the operation as a rejection response to the query displayed on the display section 12 at the step SP47. In this case, the flow of the procedure RT4 goes on to the step SP46 without purchasing the piece of musical data. If the user carries out an operation to indicate that the piece of musical data should be purchased from the music providing server 2, on the other hand, the control section 7 regards the operation as an acceptance response to the query displayed on the display section 12 at the step SP47. In this case, the flow of the procedure RT4 goes on to a step SP48 at which the control section 7 establishes a communication connection of the music reproduction terminal 4 to the music providing server 2 through the network 3. Then, in conjunction with the music providing server 2, the control section 7 carries out processing to purchase the piece of musical data from the music providing server 2. In this way, the music reproduction terminal 4 is capable of obtaining the piece of musical data from the music providing server 2 with a charge. The control section 7 stores the purchased piece of musical data in the terminal storage section 8.

Then, the flow of the procedure RT4 goes on to the next step SP49 at which the control section 7 employed in the music reproduction terminal 4 includes the musical-data identification of the piece of musical data acquired from the music providing server 2 with a charge on the transfer list described above. After the musical-data identification is included on the transfer list, the flow of the procedure RT4 goes on to the next step SP46 at which the control section 7 produces a result of determination as to whether or not the music transfer request list received from the portable music reproduction apparatus 5 still includes a musical-data identification not experiencing yet the determination process carried out at the step SP44 as a process of determination as to whether or not the piece of musical data identified by the musical-data identification has been stored in the terminal storage section 8.

If the determination result produced at the step SP46 is a negation result, the flow of the procedure RT4 goes on to the step SP50 at which the control section 7 employed in the music reproduction terminal 4 reads out a piece of musical data identified by every musical-data identification shown on the transfer list from the terminal storage section 8 and transmits the piece of musical data to the portable music reproduction apparatus 5. Finally, the flow of the procedure RT4 goes on to the last step SP51 at which the control section 7 ends the execution of the music purchasing/transfer processing procedure RT4. By the way, if the determination result produced at the step SP43 is a negation result indicating that the music reproduction terminal 4 has not received a music transfer request list from the portable music reproduction apparatus 5, the flow of the procedure RT4 goes on to the last step SP51 at which the control section 7 employed in the music reproduction terminal 4 ends the execution of the music purchasing/transfer processing procedure RT4. As described above, the music reproduction terminal 4 is capable of providing the portable music reproduction apparatus 5 with musical data according to a request made by the portable music reproduction apparatus 5 as a request for a transfer of the musical data.

Next, by referring to a flowchart shown in FIG. 13, the following description explains the list updating processing carried out at the step SP32 of the music transfer request processing procedure RT3 and the step SP42 of the music purchasing/transfer processing procedure RT4. By the way, the list updating processing is explained by dividing the processing into a list updating request processing procedure RT5 executed by the portable music reproduction apparatus 5 and a difference-list transmission processing procedure RT6 executed by the music reproduction terminal 4.

The list updating request processing procedure RT5 begins with a step SP61 at which the control section 15 employed in the portable music reproduction apparatus 5 transmits a list identification request signal to the music reproduction terminal 4 as a signal making a request for a transmission of the music management list identification of the most recent music management list L1 stored in the music reproduction terminal 4.

Then, the flow of the procedure RT5 goes on to the next step SP62 at which the control section 15 employed in the portable music reproduction apparatus 5 produces a result of determination as to whether or not a list identification notification signal showing the music management list identification of the most recent music management list L1 stored in the music reproduction terminal 4 has been received from the music reproduction terminal 4. If the result of the determination is an affirmation result, the flow of the procedure RT5 goes on to a step SP63 at which the control section 15 produces a result of determination as to whether or not the music management list identification shown in the list identification notification signal as the music management list identification of the most recent music management list L1 stored in the music reproduction terminal 4 is the same identification as the music management list identification identifying a music management list L1 stored in the portable storage section 16 employed in the portable music reproduction apparatus 5.

An affirmation determination result produced at the step SP63 proves that the music management list L1 stored in the portable storage section 16 employed in the portable music reproduction apparatus 5 is the same list as the most recent music management list L1 stored in the music reproduction terminal 4. In this case, the control section 15 employed in the portable music reproduction apparatus 5 determines that it is not necessary to update the music management list L1 stored in the portable storage section 16 employed in the portable music reproduction apparatus 5 and, finally, ends the execution of list updating request processing procedure RT5 at the last step SP69.

On the other hand, a negation determination result produced at the step SP63 proves that the music management list L1 stored in the portable storage section 16 employed in the portable music reproduction apparatus 5 is different from the most recent music management list L1 stored in the music reproduction terminal 4. In this case, the control section 15 employed in the portable music reproduction apparatus 5 determines that it is necessary to update the music management list L1 stored in the portable storage section 16 employed in the portable music reproduction apparatus 5 because the music management list L1 stored in the portable storage section 16 is an obsolete list, and the flow of the procedure RT5 goes on to a step SP64 at which the control section 15 transmits a present list identification signal to the music reproduction terminal 4 as a signal conveying the music management list identification of the music management list L1 stored in the portable storage section 16.

Then, at the next step SP65, the control section 15 employed in the portable music reproduction apparatus 5 receives a difference music management list from the music reproduction terminal 4. The difference music management list is a list of musical-data identifications identifying musical data stored in the music reproduction terminal 4 but not stored in the portable music reproduction apparatus 5, musical-data related information associated with the musical data and musical-data status of the musical data. The musical-data identifications, the musical-data related information and the musical-data status are pieces of information included on the most recent music management list L1 stored in the music reproduction terminal 4. However, these pieces of information are not included yet on the music management list L1 stored in the portable music reproduction apparatus 5. Then, the flow of the procedure RT5 goes on to the next step SP66 at which the control section 15 employed in the portable music reproduction apparatus 5 reduces the amount of information included on the received difference music management list by deleting some of the musical-data related information from the difference music management list in order to convert the format of the difference music management list into the same format as the music management list L1 already stored in the portable storage section 16.

Subsequently, the flow of the procedure RT5 goes on to the next step SP66 at which the control section 15 employed in the portable music reproduction apparatus 5 changes every musical-data status associated with a musical-data identification included on the difference music management list as the musical-data identification of musical data already stored in the portable storage section 16 to the 'musical-data existence'. Then, the flow of the procedure RT5 goes on to the next step SP68.

At the step SP68, the control section 15 employed in the portable music reproduction apparatus 5 creates a new music management list L1 by integrating the difference music management list with the obsolete music management list L1 already stored in the portable storage section 16. Then, the flow of the procedure RT5 goes on to the next step SP69 at which the control section 15 employed in the portable music reproduction apparatus 5 ends the execution of the list updating request processing procedure RT5.

In the mean time, at the first step SP71 of the difference-list transmission processing procedure RT6, the control section 7 employed in the music reproduction terminal 4 produces a result of determination as to whether or not the music reproduction terminal 4 has received a list identification request signal from the portable music reproduction apparatus 5 as a signal making a request for a transmission of the music management list identification of the most recent music management list L1 stored in the terminal storage section 8 employed in the music reproduction terminal 4. If the result of the determination is an affirmation result, the flow of the procedure RT6 goes on to a step SP72 at which the control section 7 transmits a most recent list identification notification signal to the portable music reproduction apparatus 5 as a signal conveying the identification of the most recent music management list L1 stored in the terminal storage section 8.

Then, the flow of the procedure RT6 goes on to a step SP73 at which the control section 7 employed in the music reproduction terminal 4 at which the control section 7 produces a result of determination as to whether or not a present list identification signal has been received from the portable music reproduction apparatus 5 as a signal conveying the music management list identification of the music management list L1 stored in the portable storage section 16 employed in the portable music reproduction apparatus 5. If the result of the determination is an affirmation result, the flow of the procedure RT6 goes on to a step SP74 at which the control section 7 creates a difference music management list. As described earlier, the difference music management list is a list of musical-data identifications identifying musical data stored in the music reproduction terminal 4 but not stored in the portable music reproduction apparatus 5, musical-data related information associated with the musical data and musical-data status of the musical data. The musical-data identifications, the musical-data related information and the musical-data status are pieces of information included on the most recent music management list L1 stored in the music reproduction terminal 4. However, these pieces of information are not included yet on the music management list L1 stored in the portable music reproduction apparatus 5. Then, the flow of the procedure RT6 goes on to the next step SP75.

At the step SP75, the control section 7 employed in the music reproduction terminal 4 transmits the created difference music management list to the portable music reproduction apparatus 5. Then, the flow of the procedure RT6 goes on to the last step SP76 at which the control section 7 ends the execution of the difference-list transmission processing procedure RT6. By the way, if the determination result obtained at the step SP73 is a negation result indicating that a present list identification signal has been received from the portable music reproduction apparatus 5 as a signal conveying the music management list identification of the music management list L1 stored in the portable storage section 16 employed in the portable music reproduction apparatus 5, on the other hand, the flow of the procedure RT6 goes on directly to the last step SP76 at which the control section 7 ends the execution of the difference-list transmission processing procedure RT6.

Next, by referring to a flowchart shown in FIG. 14, the following description explains a music reproduction processing procedure RT7 executed to reproduce a piece of musical data as requested through an acquired-music select screen. By the way, even though the following description explains a music reproduction processing procedure RT7 executed by the music reproduction terminal 4, it is needless to say that the portable music reproduction apparatus 5 is also capable of executing the music reproduction processing procedure RT7 in the same way as the music reproduction terminal 4.

The music reproduction processing procedure RT7 begins with a step SP81 at which the control section 7 employed in the music reproduction terminal 4 receives a signal indicating that a music reproduction request operation has been carried out by the user to specify one among pieces of musical data related information displayed on the acquired-music select screen and make a request for reproduction of a piece of musical data associated with the specified musical-data related information. As described earlier, the musical-data related information includes the names of artists for the piece of musical data to be reproduced and the title of the piece of musical data. Then, the flow of the procedure RT7 goes on to the next step SP82 at which the control section 7 searches the music management list L1 stored in the terminal storage section 8 for the musical-data status associated with the specified musical-data related information, and produces a result of determination as to whether or not the musical-data status associated with the musical-data identification is the 'musical-data existence'.

An affirmation determination result produced at the step SP82 indicates that the piece of musical data specified in the music reproduction request operation has been stored in the terminal storage section 8 employed in the music reproduction terminal 4. In this case, the flow of the procedure RT7 goes on to a step SP83 at which the control section 7 employed in the music reproduction terminal 4 reads out the piece of musical data from the terminal storage section 8 and carries out a process to reproduce the piece of musical data. Then, the flow of the procedure RT7 goes on to the next step SP84 at which the control section 7 ends the execution of the music reproduction processing procedure RT7.

A negation determination result produced at the step SP82 indicates that the piece of musical data identified by a musical-data identification specified in the music reproduction request operation has not been stored in the terminal storage section 8 employed in the music reproduction terminal 4. In this case, the flow of the procedure RT7 goes on to a step SP85 at which the control section 7 employed in the music reproduction terminal 4 displays a query message on the display section 12 of the music reproduction terminal 4 as a message requesting the user to confirm that the piece of musical data should be acquired from an external source. That is to say, the user is requested to confirm that the piece of musical data should be purchased from the external source, which is the music providing server 2 in this case.

Then, the flow of the procedure RT7 goes on to the next step SP86 at which the control section 7 employed in the music reproduction terminal 4 produces a result of determination as to whether or not a response received from the user as a response to the query message is a response indicating that the user confirms the need to acquire the piece of musical data. If the result of the determination is a negation result, the flow of the procedure RT7 goes on to the step SP84 at which the control section 7 ends the execution of the music reproduction processing procedure RT7. If the determination result produced at the step SP86 is an affirmation result, on the other hand, the flow of the procedure RT7 goes on to the step SP87 at which the control section 7 searches the music management list L1 stored in the terminal storage section 8 for musical-data status associated with the musical-data identification of the piece of musical data specified in the music reproduction request operation and changes the value of the musical-data status to the 'acquisition-request existence'. Then, the flow of the procedure RT7 goes on to the step SP84 at which the control section 7 ends the execution of the music reproduction processing procedure RT7. As a follow-up of the step SP87, the music reproduction terminal 4 acquires the piece of musical data specified in the music reproduction request operation from the music providing server 2 with a charge.

By the way, in the case of this embodiment, the music management list L1 like the one shown in FIG. 6A is applied to the music purchasing/transferring system 1. However, for example, a music management list L1X like one shown in FIG. 15 may be applied to the music purchasing/transferring system 1. In this case, a music reproduction processing procedure RT7X represented by a flowchart shown in FIG. 16 may be executed. It is to be noted that processes carried out in accordance with the music reproduction processing procedure RT7X as processes identical with their respective counterpart processes included in the flowchart shown in FIG. 14 are denoted by the same step numbers as the counterpart processes.

As shown in FIG. 15, information stored on every row of the music management list L1X includes the musical-data identification ID of musical data, musical-data related information of the musical data, trial data of the musical data and musical-data status of the musical data. The musical-data identification ID, the musical-data related information, the trial data and the musical-data status are associated with each other. The trial data of musical data is a portion of the musical data.

Figures 16, 17:
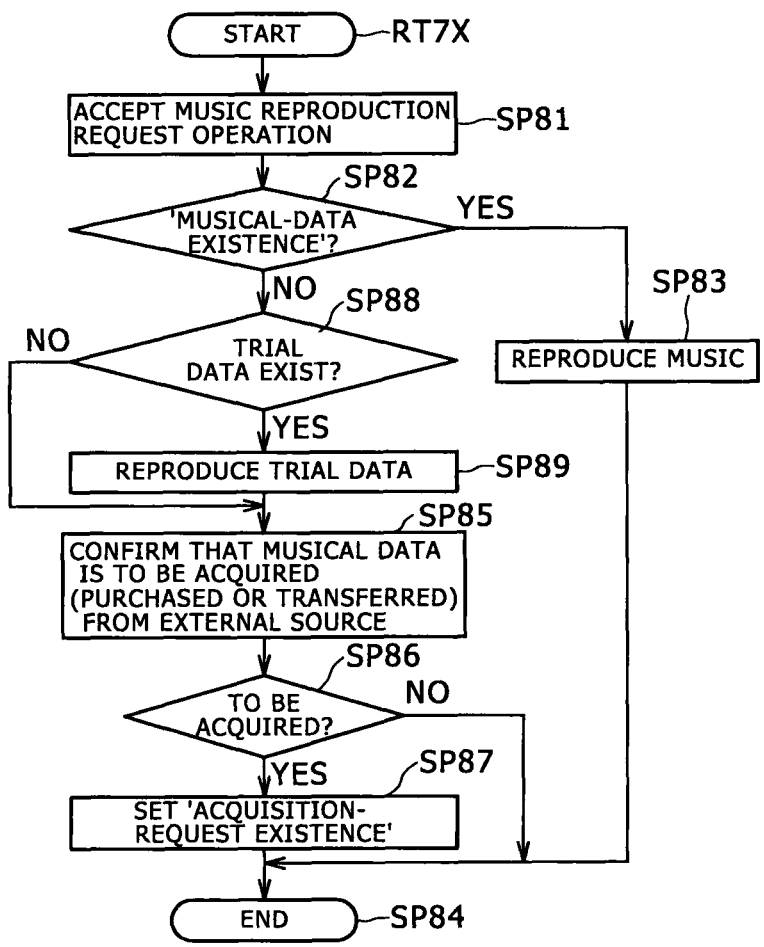
FIG. 16 shows a flowchart representing the procedure of processing carried out to reproduce a piece of musical data in accordance with the other embodiment.
FIG. 17 is a simplified explanatory diagram referred to in description of musical-data status according to another embodiment.

By referring to a flowchart shown in FIG. 16, the following description explains a music reproduction processing procedure RT7X executed by the music reproduction terminal 4 as a typical case to reproduce a piece of musical data. As shown in the figure, the flowchart begins with a step SP81 at which the control section 7 employed in the music reproduction terminal 4 receives a signal indicating that a music reproduction request operation has been carried out by the user. Then, the flow of the procedure RT7X goes on to the next step SP82 at which the control section 7 searches the music management list L1 stored in the terminal storage section 8 for the musical-data status associated with the musical-data related information specified in the music reproduction request operation, and produces a result of determination as to whether or not the musical-data status associated with the musical-data identification is the 'musical-data existence'. If the result of the determination is a negation result indicating that the musical data associated with the musical-data status has not been stored in the terminal storage section 8 employed in the music reproduction terminal 4, the flow of the procedure RT7X goes on to a step SP88 at which the control section 7 produces a result of determination as to whether or not the music management list L1X includes trial data associated with the specified musical-data related information. If the determination result produced at the step SP88 is an affirmation result, the flow of the procedure RT7X goes on to a step SP89 at which the control section 7 reads out the trial data from the music management list L1X and carries out a process to reproduce the trial data to be listened to by the user. Then, the flow of the procedure RT7X goes on to a step SP85 at which the control section 7 displays a query message on the display section 12 of the music reproduction terminal 4 as a message requesting the user to confirm that the piece of musical data should be acquired from an external source. That is to say, the user is requested to confirm that the piece of musical data should be purchased from the external source, which is the music providing server 2 in this case.

(3): Operations and Effects

In accordance with the configuration described above, the music providing server 2 has a plurality of pieces of musical data, which can be provided to the music reproduction terminal 4. The music providing server 2 also provides a music management list L1 showing musical-data identifications each used for identifying a piece of musical data, which can be provided to the music reproduction terminal 4. In the case of this embodiment, the music management list L1 also shows musical-data related information in addition to the musical-data identifications.

The music reproduction terminal 4 displays musical-data identifications included on the music management list L1 provided by the music providing server 2 on the display section 12. If an acquisition request operation is carried out by the user on the music reproduction terminal 4 in order to make a request for acquisition of musical data from the music providing server 2, the music reproduction terminal 4 acquires the musical data from the music providing server 2 when the music reproduction terminal 4 is connected to the music providing server 2 through the network 3. The acquisition request operation is an operation to select one of the musical-data identifications displayed on the display section 12 as an identification identifying the musical data to be acquired from the music providing server 2.

The music reproduction terminal 4 according to this embodiment displays musical-data identifications included on the music management list L1 provided by the music providing server 2 on the display section 12 by also displaying a checkbox CKB associated with the musical-data identification of every piece of musical data not stored yet in the terminal storage section 8. The checkbox CKB associated with a musical-data identification is an example of an 'unrecorded' format indicating that the piece of musical data identified by the musical-data identification has not been stored in the terminal storage section 8. As for a piece of musical data already stored in the terminal storage section 8, the music reproduction terminal 4 displays no checkbox CKB associated with the musical-data identification identifying the piece of musical data on the display section 12. The absence of a checkbox CKB associated with a musical-data identification is an example of a 'recorded' format indicating that the piece of musical data identified by the musical-data identification has been stored in the terminal storage section 8.

Thus, when the user carries out an acquisition request operation in order to select one of the musical-data identifications displayed on the display section 12 as an identification identifying the musical data to be acquired from the music providing server 2, the user is capable of easily distinguishing a musical-data identification identifying a piece of musical data already stored in the music reproduction terminal 4 from a musical-data identification identifying a piece of musical data not stored yet in the music reproduction terminal 4 because the musical-data identification identifying the piece of musical data already stored in the music reproduction terminal 4 is displayed as an identification different from the musical-data identification identifying the piece of musical data not stored yet in the music reproduction terminal 4. In addition, the user is capable of easily recognizing a piece of musical data to be acquired from the music providing server 2.

In accordance with the configuration described above, when the user carries out an operation to select one of musical-data identifications displayed on the display section 12, as described above, the user is capable of easily distinguishing a musical-data identification identifying a piece of musical data already stored in the music reproduction terminal 4 from a musical-data identification identifying a piece of musical data not stored yet in the music reproduction terminal 4 because the musical-data identification identifying the piece of musical data already stored in the music reproduction terminal 4 is displayed as an identification different from the musical-data identification identifying the piece of musical data not stored yet in the music reproduction terminal 4. Thus, the user is capable of easily recognizing a piece of musical data to be acquired from the music providing server 2. As a result, the music reproduction terminal 4 can be requested to acquire a piece of musical data from the music providing server 2 in a remarkably efficient manner.

By the way, in the case of this embodiment, the list updating processing includes a list updating request processing procedure RT5 executed by the portable music reproduction apparatus 5 and a difference-list transmission processing procedure RT6 executed by the music reproduction terminal 4 as described above. However, the music reproduction terminal 4 may also execute the list updating request processing procedure RT5. In this case, the music providing server 2 executes the difference-list transmission processing procedure RT6. In this way, the most recent music management list L1 stored in the music providing server 2 can be reflected in the music reproduction terminal 4.

(4): Other Embodiments

In the embodiment described above, as shown in FIG. 6B, the musical-data status of the music management list L1 includes information on existence/non-existence of musical data and information on existence/non-existence of a request for acquisition of the musical data. As explained earlier, the information on existence/non-existence of musical data is information indicating whether or not the musical data exists in the apparatus in which the music management list L1 has been stored. On the other hand, the information on existence/non-existence of a request for acquisition of specific musical data is information indicating whether or not a request has made by an external requester as a request for acquisition of the specific musical data. However, the scope of the present invention is not limited to this embodiment. For example, as a substitute for the information on existence/non-existence of a request for acquisition of specific musical data, the musical-data status may include transfer-request existence/non-existence information and purchase-request existence/non-existence information in a format shown in FIG. 17. The transfer-request existence/non-existence information is information on whether or not there is a request for a transfer of musical data from an external source for free. On the other hand, the purchase-request existence/non-existence information is information on whether or not there is a request to purchase musical data from an external source with a charge. In the case of this format, when the user carries out an operation to put a purchase mark PM on a checkbox CKB displayed on a row as shown in FIG. 18, for example, the music reproduction terminal 4 (or the portable music reproduction apparatus 5) sets the purchase-request existence/non-existence information included in the musical-data status on the row at a value of 'purchase-request existence' indicating that there is a request to purchase the musical data associated with the row. By the same token, when the user carries out an operation to put a checkmark CKM on a checkbox CKB displayed on a row as shown in FIG. 18, the music reproduction terminal 4 (or the portable music reproduction apparatus 5) sets the transfer-request existence/non-existence information included in the musical-data status on the row at a value of 'transfer-request existence' indicating that that there is a request for a transfer of the musical data associated with the row. If the purchase-request existence/non-existence information included in the musical-data status on a row is set at a value of 'purchase-request existence', the music reproduction terminal 4 (or the portable music reproduction apparatus 5) carries out processing to purchase the musical data associated with the row with a charge from an external source such as the music providing server 2. If the transfer-request existence/non-existence information included in the musical-data status on a row is set at a value of 'transfer-request existence', on the other hand, the music reproduction terminal 4 (or the portable music reproduction apparatus 5) carries out processing to transfer the musical data associated with the row for free from an external source such as the music providing server 2.

Figure 8B:
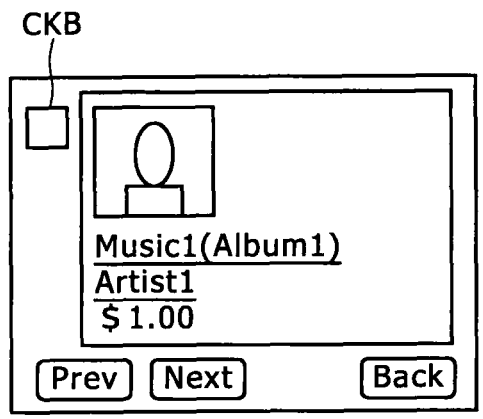
Figure 8C:
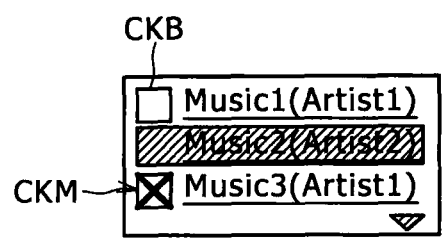

In addition, in the embodiment described above, the screen shown in FIG. 8A is used as the acquired-music select screen. In dependence on the ability of the display section for displaying the acquired-music select screen, however, the picture of a jacket showing an artist for musical data can also be displayed on the acquired-music select screen as shown in FIG. 8B or, conversely, displayed information can be simplified as shown in FIG. 8C. The ability of the display section for displaying the acquired-music select screen includes the size of the display area of the display section.

In addition, in the embodiment described above, the portable music reproduction apparatus 5 is not connected to the music providing server 2. However, the scope of the present invention is not limited to this embodiment. That is to say, the portable music reproduction apparatus can also be connected directly to the music providing server 2. A portable music reproduction apparatus 5 connected directly to the music providing server 2 is capable of purchasing musical data from the music providing server 2 directly by execution of the same processing as the processing of the music reproduction terminal 4 as described above.

In addition, in the embodiment described above, the portable music reproduction apparatus 5 acquires the music management list L1 stored in the music providing server 2 through the music reproduction terminal 4. However, the scope of the present invention is not limited to this embodiment. If the portable music reproduction apparatus 5 is connected directly to the music providing server 2, for example, the portable music reproduction apparatus 5 is capable of acquiring musical data from the music providing server 2.

In addition, in the embodiment described above, musical data is treated as a content. However, the scope of the present invention is not limited to this embodiment. The present invention can also be applied to video data and program data.

In addition, in the embodiment described above, every row of the music management list L1 includes a musical-data identification for identifying musical data as well as musical-data related information and musical data status, which are associated with the musical-data identification. As described earlier, the musical-data identification is the ID of the musical data, the musical-data related information is information related to the musical data whereas the musical-data status is the status of the musical data. The musical-data related information of musical data includes the title of the musical data, the names of artists for the musical data, the name of an album including the musical data and the picture of a jacket covering the album. However, the scope of the present invention is not limited to this embodiment. For example, the musical-data identification may include information on other musical data. In this case, in addition to the aforementioned ID of the musical data, the musical-data identification includes information on links to the other pieces of musical data. A musical-data identification including information on links to other pieces of musical data as shown in FIG. 19B is accommodated in a music management link L1Y, the configuration of which is shown in FIG. 19A.

The basic structure itself of the music management list L1Y is all but the same as that of the music management list L1 shown in FIG. 6A. As shown in FIG. 19B, however, the musical-data identification of the L1Y is extended. As an example, the musical-data identification shown in FIG. 19B has two links to respectively two other pieces of musical data. By the way, the upper limit of the number of links that can be included in a musical-data identification is not prescribed in particular. That is to say, as many links as possible can be included in the same musical-data identification, being ended with a link termination. In addition, the upper limit of the number of links that can be included in a musical-data identification can of course be prescribed. A link is used typically for binding a content included in the same album as the musical data identified by the content ID included in the musical-data identification as the ID of the musical data.

By using the content ID included a musical-data identification of the music management list L1Y with such a structure as a substitute for the ID included in the music management list L1 shown in FIG. 6A, the processing to display an acquired-music select screen, the processing to select acquired musical data, the transfer/purchasing processing and the list updating processing can be carried out as the same procedures as the embodiment described earlier.

Figure 20:
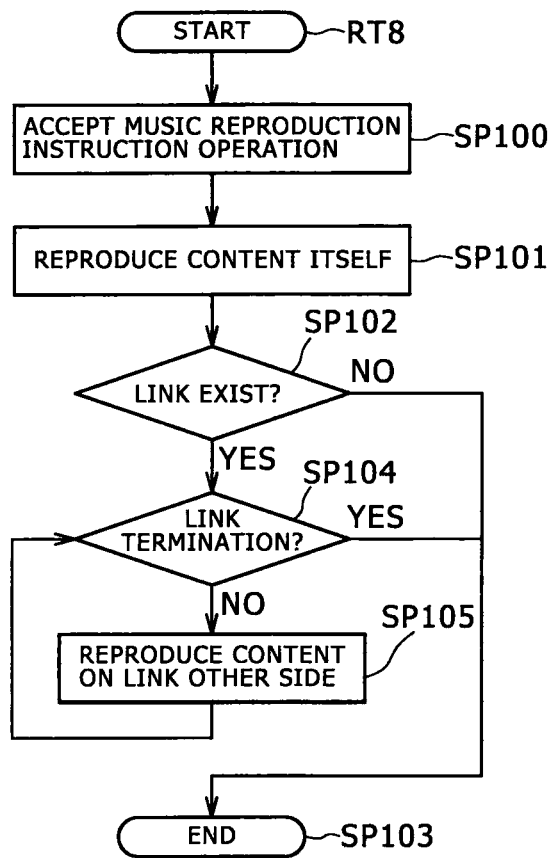
FIG. 20 shows a flowchart representing the procedure of processing carried out to reproduce pieces of musical data in accordance with the further embodiment.

On the other hand, the processing to reproduce musical data can be carried out in accordance with a music reproduction processing procedure RT8 described by referring to a flowchart shown in FIG. 20 as follows. As shown in the figure, the flowchart begins with a step SP100 at which the control section 15 employed in the portable music reproduction apparatus 5 receives a signal indicating that a music reproduction request operation has been carried out by the user to specify one among pieces of musical data related information displayed on the acquired-music select screen and make a request for reproduction of a content associated with the specified musical-data related information. Then, the flow of the procedure RT8 goes on to the next step SP101 at which the control section 15 employed in the portable music reproduction apparatus 5 carries out a process to reproduce the content (that is, musical data) in the same way as the process carried out at the step SP83 of the flowchart shown in FIG. 14 as a flowchart representing the music reproduction processing procedure RT7. Then, the flow of the procedure RT8 goes on to the next step SP102.

At the step SP102 after the process to reproduce the content is completed, the control section 15 refers to the musical-data identification of the content and produces a result of determination as to whether or not this content has a link. If the result of the determination is a negation result, that is, if the content does not have a link, the flow of the procedure RT8 goes on to a step SP103 at which the control section 15 ends the execution of the music reproduction processing procedure RT8. If the determination result produced at the step SP102 is an affirmation result, that is, if this content has a link, on the other hand, the flow of the procedure RT8 goes on to a step SP104.

At the step SP104, the control section 15 produces a result of determination as to whether or not a link termination in the musical-data identification of the content has been reached. If the result of the determination is a negation result indicating that the link termination has not been reached, the flow of the procedure RT8 goes on to a step SP105 at which the control section 15 carries out a process to reproduce a content on the other side of the present link included in the musical-data identification. Then, the flow of the procedure RT8 goes back to a step SP104. The processes of the steps SP104 and SP105 are carried out repeatedly as long as the result determination result produced at the step SP104 is a negation result. As the result determination result produced at the step SP104 becomes an affirmation result indicating that the link termination has been reached, that is, as the process to sequentially reproduce contents on the other sides of all links included in the musical-data identification has been completed, the flow of the procedure RT8 goes on to the step SP103 at which the control section 15 ends the execution of the music reproduction processing procedure RT8. Typically, the contents on the other sides of all links included in the musical-data identification are contents pertaining to the same album. Thus, in accordance with the music reproduction processing procedure RT8, the portable music reproduction apparatus 5 is capable of consecutively reproducing contents cataloged in an album. By the way, an operation may be carried out to purchase an album to be reproduced as described above. In the operation carried out to purchase an album, in some cases, the user may not be requested to confirm the purchase of a content to be placed on the other side of each link.

Figure 21:
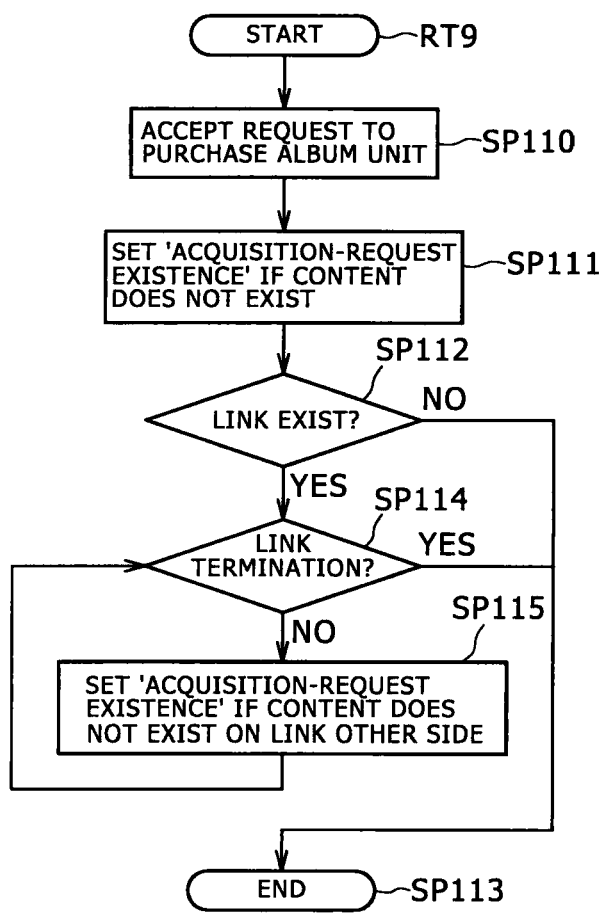
FIG. 21 shows a flowchart representing the procedure of processing carried out to purchase pieces of musical data in accordance with the further embodiment.

The operation to purchase an album to be reproduced as described above can be carried out as a process to purchase a content to be placed on the other side of each link. The process to purchase a content to be placed on the other side of each link is carried out in accordance with a flowchart shown in FIG. 21 as a flowchart representing a purchasing processing procedure RT9. As shown in the figure, the purchasing processing procedure RT9 begins with a step SP110 at which the control section 15 employed in the portable music reproduction apparatus 5 receives a signal representing an operation carried out by the user to make a request to purchase an album by operating the operation section 17. Then, at the next step SP111, the control section 15 sets the 'acquisition-request existence' in the acquisition-request existence/non-existence information of the musical-data status of the album itself (or, to be more specific, the musical-data status of the first content pertaining to the album) if the musical-data existence/non-existence information of the musical-data status is 'musical-data non-existence'. Subsequently, the flow of the procedure RT9 goes on to the next step SP112.

At the step SP112, the control section 15 refers to the musical-data identification of the album itself (or, to be more specific, the musical-data identification of the first content pertaining to the album) and produces a result of determination as to whether or not the first content of the album has a link. If the result of the determination is a negation result, that is, if the album does not have a link, the flow of the procedure RT9 goes on to a step SP113 at which the control section 15 ends the execution of the music reproduction processing procedure RT9. If the determination result produced at the step SP112 is an affirmation result, that is, if this album has a link, on the other hand, the flow of the procedure RT9 goes on to a step SP114.

At the step SP114, the control section 15 produces a result of determination as to whether or not a link termination in the musical-data identification has been reached. If the result of the determination is a negation result indicating that the link termination has not been reached, the flow of the procedure RT9 goes on to a step SP115 at which the control section 15 carries out a process to set the 'acquisition-request existence' in the acquisition-request existence/nonexistence information of a content on the other side of the present link included in the musical-data identification if the musical-data existence/nonexistence information of the content is the 'musical-data non-existence'. Then, the flow of the procedure RT9 goes on to the step SP114. The processes of the steps SP114 and SP115 are carried out repeatedly as long as the result of the determination is a negation result. As the result of the determination becomes an affirmation result indicating that the link termination has been reached, on the other hand, the flow of the procedure RT9 goes on to the step SP113 at which the control section 15 ends the execution of the music reproduction processing procedure RT9. The affirmation determination result indicates the completion of the process to sequentially set the 'acquisition-request existence' in the acquisition-request existence/nonexistence information for a content on the other side of each of links included in the musical-data identification in order to verify the status of all contents in the album. Thus, in accordance with the music reproduction processing procedure RT9, the portable music reproduction apparatus 5 is capable of setting the 'acquisition-request existence' in the acquisition-request existence/nonexistence information for all contents of an album at one time if the musical-data existence/nonexistence information of the content is the 'musical-data non-existence'. By the way, the processing to set the 'acquisition-request existence' in the acquisition-request existence/nonexistence information can be carried out only on pieces of musical data of an album.

The following description explains a method to acquire musical-data (contents) of an album in batch processing for a case in which a musical-data identification includes links indicating that the contents pertain to the same album. If the method is executed to simply acquire all musical contents of an album, there may be conceivably a case in which already acquired musical content and/or musical contents are requested again as contents to be acquired. Since purchasing such musical contents more than once is an unnecessarily wasteful burden to be borne by the user, it is necessary to provide a desirable method, which is a method never allowing the same content to be acquired twice or more or a method not allowing a process of purchasing the same content to be carried out more than once.

Figure 22:
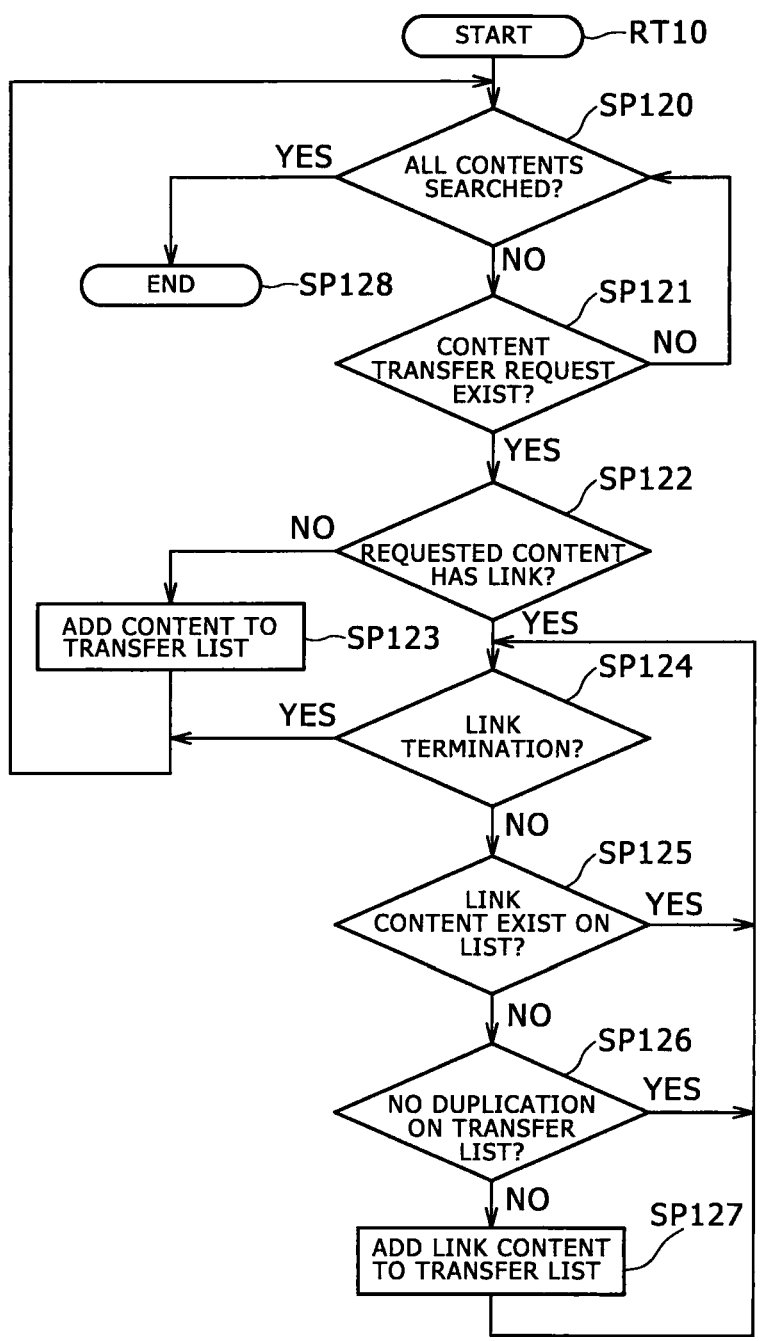
FIG. 22 shows a flowchart representing the procedure of processing to generate a list of music transfer requests in accordance with the further embodiment.

By referring to a flowchart shown in FIG. 22, the following description explains processing carried out by the portable music reproduction apparatus 5 to generate a list of music transfer requests as processing satisfying the conditions explained above. By the way, the processing to generate a list of music transfer requests is processing carried out at the step SP33 of the flowchart shown in FIG. 11 as a flowchart representing the music transfer/purchasing processing procedure RT3 described before.

As shown in FIG. 22, the procedure RT10 of the processing to generate a list of music transfer requests begins with a step SP120 at which the control section 15 employed in the portable music reproduction apparatus 5 produces a result of determination as to whether or not the music management list L1Y has been searched completely for all its contents. Let us assume for example that the music management list L1Y includes one or more contents and the control section 15 has not searched for even one content. In this case, the determination result produced at the step SP120 is a negation result so that the flow of the procedure RT10 goes on to a step SP121.

At the step SP121, the control section 15 searches the music management list L1Y for a content and produces a result of determination as to whether or not the musical-data status of the content is the 'acquisition-request existence'. If the determination result produced at the step SP121 is a negation result, the flow of the procedure RT10 goes back to the step SP120 at which the control section 15 produces a result of determination as to whether or not the music management list L1Y has been searched completely for all its contents and searches the music management list L1Y for a next content provided that the music management list L1Y has not been exhausted. If the determination result produced at the step SP121 is an affirmation result indicating that the musical-data status of the content found in the search process is the 'acquisition-request existence', on the other hand, the control section 15 continues the procedure RT10 to the step SP122.

At the step SP122, the control section 15 produces a result of determination as to whether or not the musical-data identification of the content having the musical-data status set at the 'acquisition-request existence' includes a link. A negation determination result indicates for example that the content is a single content. In this case, the flow of the procedure RT10 goes on to a step SP123 at which the control section 15 adds this content to a music transfer request list. Then, the flow of the procedure RT10 goes back to the step SP120 at which the control section 15 produces a result of determination as to whether or not the music management list L1Y has been searched completely for all its contents and searches the music management list L1Y for a next content provided that the music management list L1Y has not been exhausted. On the other hand, an affirmation determination result produced at the step SP122 indicates that the content is a content pertaining to an album comprising a plurality of musical contents. In this case, the control section 15 continues the flow of the procedure RT10 to a step SP124.

At the step SP124, the control section 15 produces a result of determination as to whether or not a link termination in the musical-data identification has been reached. If the link termination has not been reached, the flow of the procedure RT10 goes on to a step SP125 at which the control section 15 produces a result of determination as to whether or not a content on the other side of the present link is a content cataloged on the music management list L1Y, that is, whether or not the content has already been acquired. If the content on the other side of the present link is a content cataloged on the music management list L1Y, that is, if the content has already been acquired, the flow of the procedure RT10 goes back to the step SP124. The processes of the steps SP124 and SP125 are carried out repeatedly on one link after another along the musical-data identification as long as the determination result produced at the step SP124 indicates that the link termination has not been reached and the determination result produced at the step SP125 indicates that the content on the other side of the present link is a content cataloged on the music management list L1Y, that is, the content has already been acquired.

As the determination result produced at the step SP124 indicates that the link termination has been reached, the flow of the procedure RT10 goes back to the step SP120 at which the control section 15 produces a result of determination as to whether or not the music management list L1Y has been searched completely for all its contents and searches the music management list L1Y for a next content provided that the music management list L1Y has not been exhausted or, as the determination result produced at the step SP125 indicates that the content on the other side of the present link is not a content on the music management list L1Y, that is, if the content has not already been acquired, the flow of the procedure RT10 goes on to a step SP126. At the step SP126, the control section 15 produces a result of determination as to whether or not the content on the other side of the present link has been put on the music transfer request list. If the result of the determination indicates that the content on the other side of the present link has been put on the music transfer request list, the flow of the procedure RT10 goes back to the step SP124. If the result of the determination indicates that the content on the other side of the present link has not been put on the music transfer request list, on the other hand, the flow of the procedure RT10 goes on to a step SP127. At the step SP127, the control section 15 adds the content on the other side of the present link to the music transfer request list. Then, the flow of the procedure RT10 goes back to the step SP124.

As described above, the control section 15 determines whether or not the musical-data specification of a content, the transfer of which has been requested, includes a link. If the musical-data specification of such a content includes links, for each link, the control section 15 determines whether or not a content on the other side of the link has been acquired. If the content on the other side of the link has not been acquired, the control section 15 determines whether or not the content has been put on a music transfer request list. If the content on the other side of the link has neither been acquired nor put on the music transfer request list, the content is added to the music transfer request list.

If the determination result produced at the step SP120 is an affirmation result indicating that the music management list L1Y has been searched completely for all its contents, the flow of the procedure RT10 goes on to a step SP128 at which the control section 15 ends the execution of the procedure RT10 of the processing to generate a music transfer request list.

By generating a music transfer request list in accordance with the processing procedure RT 10 as described above, the portable music reproduction apparatus 5 is capable of acquiring contents of an album by preventing an already transferred content from being acquired again. It is to be noted that the procedure RT10 of the processing to generate a music transfer request list can also be carried out by the control section 7 employed in the music reproduction terminal 4.

The music providing server 2 at the upper-most level may also identify only contents that have not been transferred yet to the music reproduction terminal 4 and pick up the contents to be transferred to the music reproduction terminal 4. In this case, the music reproduction terminal 4 transfers information on all contents already stored in the music reproduction terminal 4 at the same time as a request transmitted to the music providing server 2 as a request for a transfer of contents from the music providing server 2. If the music reproduction terminal 4 makes a request for a transfer of an album, the music providing server 2 traces links of the album to determine whether or not a content on the other side of each of the links has been stored in the music reproduction terminal 4. By the same token, the music reproduction terminal 4 at a level higher than the portable music reproduction apparatus 5 may also identify only contents that have not been transferred yet to the portable music reproduction apparatus 5 and pick up the contents to be transferred to the portable music reproduction apparatus 5. In this case, the portable music reproduction apparatus 5 transfers information on all contents already stored in the portable music reproduction apparatus 5 at the same time as a request transmitted to the music reproduction terminal 4 as a request for a transfer of contents from the music reproduction terminal 4. If the portable music reproduction apparatus 5 makes a request for a transfer of an album, the music reproduction terminal 4 traces links of the album to determine whether or not a content on the other side of each of the links has been stored in the portable music reproduction apparatus 5.

The format of the musical-data identification is allowed to include links such as links to other pieces of musical data as described above. As a matter of fact, the links included in the musical-data identification are not limited to links to contents pertaining to an album. That is to say, the links can be links to contents pertaining to any of a variety of groups other than an album. For example, the links can be links to contents pertaining to the so-called celebrity playlist, which is a group of songs (or albums) arranged in a certain reproduction order as favorites with the user. Typically, songs (or albums) pertaining to a celebrity playlist are songs (or albums) originally sung by an artist, an entertainer or a famous person.

Figure 23:
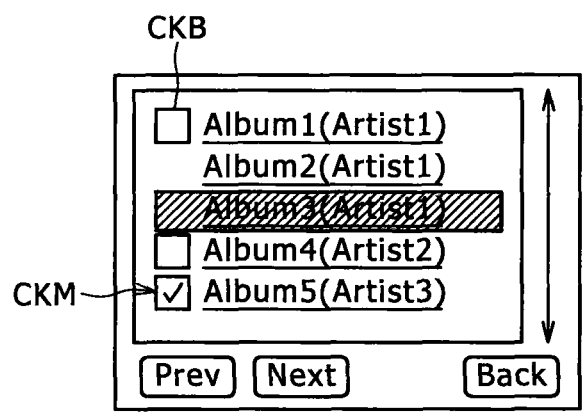
FIG. 23 is a simplified explanatory diagram referred to in description of a second acquired-music select screen according to a further embodiment.

With such an extended format, the musical-data identification may further include the title of an album, the names of artists singing songs included in the album, the name of a playlist and the names of an artist, entertainer and/or famous person related to the playlist. With the musical-data identification further including the title of an album and the names of artists singing songs included in the album, the acquired-music select screen displays information on every album. Typically, the information on an album is the title of the album and the name of an artist singing songs pertaining to the album as shown in FIG. 23. Also shown in the same figure, the acquired-music select screen also displays a checkbox CKB for every album that has not been stored in the music reproduction terminal 4 or the portable music reproduction apparatus 5.

When the user carries out an operation to put a checkmark CKM on a checkbox CKB associated with an album appearing on an acquired-music select screen displayed by the music reproduction terminal 4, the music reproduction terminal 4 generates a music request music transfer request list in accordance with the procedure RT10 described above on the basis of the ID of the first musical content of the album and links connecting the first musical content to other musical contents pertaining to the album, transmitting the music request music transfer request list to the music providing server 2 in order to acquire necessary musical contents of the album from the music providing server 2 in a batch process. By the same token, when the user carries out an operation to put a checkmark CKM on a checkbox CKB associated with an album appearing on an acquired-music select screen displayed by the portable music reproduction apparatus 5, the portable music reproduction apparatus 5 generates a music request music transfer request list in accordance with the procedure RT10 described above on the basis of the ID of the first musical content of the album and links connecting the first musical content to other musical contents pertaining to the album, transmitting the music request music transfer request list to the music reproduction terminal 4 in order to acquire necessary musical contents of the album from the music reproduction terminal 4 in a batch process. In either case, the ID of the first musical content and the links are included in a musical-data identification associated with the checkbox CKB.

Figure 24:
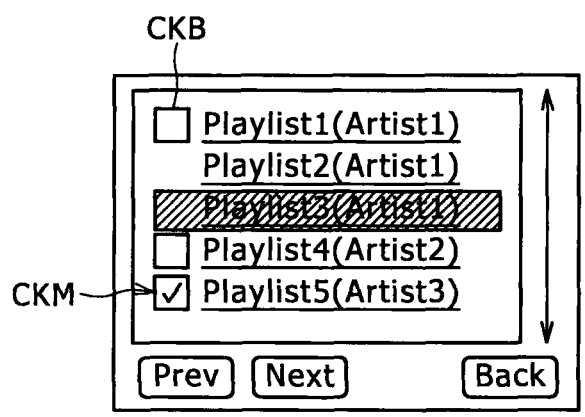
FIG. 24 is a simplified explanatory diagram referred to in description of a third acquired-music select screen according to a still further embodiment.

In addition, with the musical-data identification further including the title of a playlist and the names of an artist, entertainer and/or famous person related to the playlist as described above, the acquired-music select screen displays information on every playlist. Typically, the information on a playlist is the title of the playlist and the name of an artist singing songs pertaining to the playlist as shown in FIG. 24. Also shown in the same figure, the acquired-music select screen also displays a checkbox CKB for every playlist that has not been stored in the music reproduction terminal 4 or the portable music reproduction apparatus 5.

When the user carries out an operation to put a checkmark CKM on a checkbox CKB associated with a playlist appearing on an acquired-music select screen displayed by the music reproduction terminal 4, the music reproduction terminal 4 generates a music request music transfer request list in accordance with the procedure RT10 described above on the basis of the ID of the first musical content of the playlist and links connecting the first musical content to other musical contents pertaining to the playlist, transmitting the music request music transfer request list to the music providing server 2 in order to acquire necessary musical contents of the playlist from the music providing server 2 in a batch process. By the same token, when the user carries out an operation to put a checkmark CKM on a checkbox CKB associated with a playlist appearing on an acquired-music select screen displayed by the portable music reproduction apparatus 5, the portable music reproduction apparatus 5 generates a music request music transfer request list in accordance with the procedure RT10 described above on the basis of the ID of the first musical content of the playlist and links connecting the first musical content to other musical contents pertaining to the playlist, transmitting the music request music transfer request list to the music reproduction terminal 4 in order to acquire necessary musical contents of the playlist from the music reproduction terminal 4 in a batch process. In either case, the ID of the first musical content and the links are included in a musical-data identification associated with the checkbox CKB.

Figure 25:
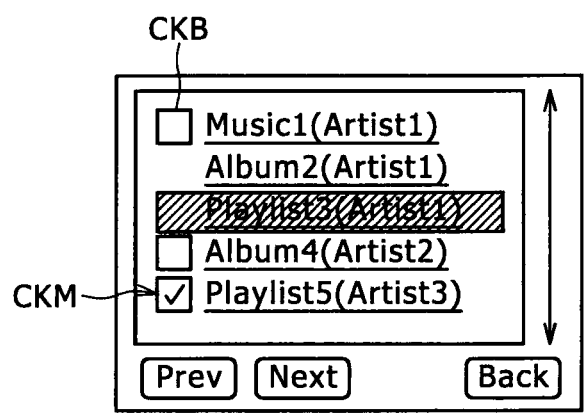
FIG. 25 is a simplified explanatory diagram referred to in description of a fourth acquired-music select screen according to a still further embodiment.

By acquiring a plurality of necessary pieces of musical data of an album or a playlist from an upper level apparatus in a batch process as described above, the operation to acquire the musical data can be carried out in a remarkably easy manner. In batch process, if a part of musical data of an album or a playlist described above already stored in the portable storage section, a necessary pieces of musical data excluding the part of musical data may be requested to the external source. By the way, the number of links may vary in dependence on the musical-data identification on the music management list L1Y. In addition, the music management list L1Y may include mixed musical-data identifications as identifications associated with different groups of contents. In this case, the acquired-music select screen displays mixed information rows for different information units, which can each be a song, an album or a playlist as shown in FIG. 25. As shown in the figure, in the case of a song, the information unit includes the title of the song and the name of an artist singing the song. In the case of an album, the information unit includes the title of the album and the name of an artist singing songs pertaining to the album. In the case of a playlist, the information unit includes the title of the playlist and the name of a person creating the playlist.

In the case of the embodiment described above, the control section 22 employed in the music providing server 2, the control section 7 employed in the music reproduction terminal 4 and/or the control section 15 employed in the portable music reproduction apparatus 5 executes programs installed in advance as software for implementing the processing procedures RT1 to RT7. However, the scope of the present invention is not limited to the embodiment. For example, the processing procedures RT1 to RT7 can also be implemented by hardware. The programs to be executed in order to carry out the processing procedures RT1 to RT7 can also be recorded in advance in a recording medium such as a CD (Compact Disc) beforehand prior to installation of the programs in the music providing server 2, the music reproduction terminal 4 and/or the portable music reproduction apparatus 5.

By the way, the content acquisition apparatus 100 shown in FIG. 1 corresponds to the music reproduction terminal 4 and the portable music reproduction apparatus 5. The display section 102 shown in FIG. 1 corresponds to the display section 12 employed in the music reproduction terminal 4 and display section 20 employed in the portable music reproduction apparatus 5. The content storage section 101 employed in the content acquisition apparatus 100 shown in FIG. 1 corresponds to the terminal storage section 8 employed in the music reproduction terminal 4 and portable storage section 16 employed in the portable music reproduction apparatus 5. The output section 103 employed in the content acquisition apparatus 100 shown in FIG. 1 corresponds to the control section 7 employed in the music reproduction terminal 4 and control section 15 employed in the portable music reproduction apparatus 5. The content acquisition section 104 employed in the content acquisition apparatus 100 shown in FIG. 1 also corresponds to the control section 7 employed in the music reproduction terminal 4 and control section 15 employed in the portable music reproduction apparatus 5.

The present invention can be applied to a content acquisition apparatus such as a personal computer, which serves as a music playback terminal, and a portable music player.

While preferred embodiments of the present invention have been described using specific terms, such description is for illustrative purpose only, and it is to be understood that changes and variations may be made without departing from the spirit or scope of the following claims.

What is claimed is:

1. A method for generating or updating a transfer list, comprising:

receiving, by a first device, a list of requested multimedia items from a second device including a processor and a memory;

determining, by the first device, if the requested multimedia items are stored on the first device;

when it is determined that one or more of the requested multimedia items are not stored on the first device, requesting, by the first device, the one or more of the requested multimedia items from a third device and receiving, by the first device, the one or more of the requested multimedia items from the third device; and generating or updating, by the first device, the transfer list indicating multimedia items to be sent to the second device, wherein the second device comprises: a content storage configured to store a first content and a multimedia management list, wherein the multimedia management list includes an identifier of the first content; a communication unit configured to transmit the multimedia management list to the first device, and configured to acquire a difference multimedia management list including an identifier of a second content, wherein the identifier of the first content is different from the identifier of the second content; and a display unit configured to display the second identifier.

2. The method of claim 1, wherein the second device is a portable device.

3. The method of claim 1, wherein the first device is a personal computer.

4. The method of claim 1, wherein the third device is a computer of an online music store.

5. The method of claim 1, wherein the list of requested multimedia items from the second device is generated by tagging multimedia items on the second device.

6. A non-transitory recording medium storing a program for generating or updating a transfer list which, when executed by a processor of a first device, performs a method comprising:
   receiving, by the first device, a list of requested multimedia items from a second device including a processor of the second device and a memory;
   determining, by the first device, if the requested multimedia items are stored on the first device;
   when it is determined that one or more of the requested multimedia items are not stored on the first device, requesting, by the first device, the one or more of the requested multimedia items from a third device and receiving, by the first device, the one or more of the requested multimedia items from the third device; and
   generating or updating, by the first device, the transfer list indicating multimedia items to be sent to the second device,
   wherein the second device comprises: a content storage configured to store a first content and a multimedia management list, wherein the multimedia management list includes an identifier of the first content; a communication unit configured to transmit the multimedia management list to the first device, and configured to acquire a difference multimedia management list including an identifier of a second content, wherein the identifier of the first content is different from the identifier of the second content; and a display unit configured to display the second identifier.

7. The non-transitory recording medium of claim 6, wherein the second device is a portable device.

8. The non-transitory recording medium of claim 6, wherein the first device is a personal computer.

9. The non-transitory recording medium of claim 6, wherein the third device is a computer of an online music store.

10. The non-transitory recording medium of claim 6, wherein the list of requested multimedia items from the second device is generated by tagging multimedia items on the second device.

11. The non-transitory recording medium of claim 6, wherein the recording medium is a compact disc.

12. The non-transitory recording medium of claim 6, wherein the program is recorded on the recording medium prior to installation of the program.

13. A transfer list updating or generating device, comprising:
   a processor of the transfer list updating or generating device;
   a memory of the transfer list updating or generating device;
   wherein the transfer list updating or generation device is configured to:
   receive, by a first device, a list of requested multimedia items from a second device including a processor of the second device and a memory of the second device,
   determine, by the first device, if the requested multimedia items are stored on the first device,
   when it is determined that one or more of the requested multimedia items are not stored on the first device, request, by the first device, the one or more of the requested multimedia items from a third device and receive, by the first device, the one or more of the requested multimedia items from a the third device, and
   generate or update, by the first device, a transfer list indicating multimedia items to be sent to the second device,
   wherein the second device comprises: a content storage configured to store a first content and a multimedia management list, wherein the multimedia management list includes an identifier of the first content; a communication unit configured to transmit the multimedia management list to the first device, and configured to acquire a difference multimedia management list including an identifier of a second content, wherein the identifier of the first content is different from the identifier of the second content; and a display unit configured to display the second identifier.

14. The transfer list updating or generating device of claim 13, wherein the second device is a portable device.

15. The transfer list updating or generating device of claim 13, wherein the transfer list updating or generating device is a personal computer.

16. The transfer list updating or generating device of claim 13, wherein the third device is a computer of an online music store.

17. The transfer list updating or generating device of claim 13, wherein the list of requested multimedia items from the second device is
   generated by tagging multimedia items on the second device.

* * * * *